(12) United States Patent
Schmidt et al.

(10) Patent No.: US 10,345,795 B2
(45) Date of Patent: Jul. 9, 2019

(54) SYSTEMS AND METHODS TO ENHANCE MACHINE DESIGNS AND PRODUCTION RATE SCHEDULES FOR MINIMIZED ENERGY COST

(71) Applicant: ROCKWELL AUTOMATION TECHNOLOGIES, INC., Mayfield Heights, OH (US)

(72) Inventors: Robert H. Schmidt, Germantown, WI (US); Aderiano M. da Silva, Milwaukee, WI (US); Peter B. Schmidt, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 543 days.

(21) Appl. No.: 14/978,998

(22) Filed: Dec. 22, 2015

(65) Prior Publication Data

US 2017/0176984 A1      Jun. 22, 2017

(51) Int. Cl.
*G05B 19/418*      (2006.01)
*G05B 17/02*      (2006.01)

(52) U.S. Cl.
CPC ......... *G05B 19/4188* (2013.01); *G05B 17/02* (2013.01); *G05B 19/41885* (2013.01);
(Continued)

(58) Field of Classification Search
CPC .................. G05B 19/4188; G05B 2219/31343
See application file for complete search history.

(56) References Cited

U.S. PATENT DOCUMENTS 4,701,698 A * 10/1987 Karlsson .............. G01R 21/133
324/103 R
2002/0010563 A1 * 1/2002 Ratteree ................. G06Q 10/06
703/2
(Continued)

FOREIGN PATENT DOCUMENTS

EP      2278420 A1      1/2011
EP      2846207 A1      3/2015

OTHER PUBLICATIONS

Akyol, S.D., Bayhan, G.M., "A particle swarm optimization algorithm for maximizing production rate and workload smoothness," Third World Congress on Nature and Biologically Inspired Computing (NaBIC), pp. 44-49, 2011.
(Continued)

*Primary Examiner* — Kenneth M Lo
*Assistant Examiner* — Mohammad A Rahman
(74) *Attorney, Agent, or Firm* — Fletcher Yoder P.C.

(57) ABSTRACT

In one embodiment, a tangible, non-transitory computer readable medium stores instructions that, when executed by a processor, are configured to cause the processor to receive a first set of inputs including a motion profile of a machine, a mechanical design of the machine, or both, generate a number of axis solutions for one or more actuators, drives, and load transmission components based on a model using the first set of inputs, generate a production rate versus amount of energy consumed per part curve for each of the number of axis solutions, and display the production rate versus amount of energy consumed per part curves for each of the number of axis solutions. One of the curves includes a point on the curve indicative of a lowest amount of energy consumed for a desired production rate range.

18 Claims, 12 Drawing Sheets

(52) U.S. Cl.
CPC .............. *G05B 2219/23022* (2013.01); *G05B 2219/23456* (2013.01); *G05B 2219/31343* (2013.01); *Y02P 80/114* (2015.11); *Y02P 90/20* (2015.11); *Y02P 90/26* (2015.11); *Y02P 90/265* (2015.11)

(56) References Cited

U.S. PATENT DOCUMENTS

| | | | | |
|---|---|---|---|---|
| 2009/0326695 | A1* | 12/2009 | Macharia | G05B 13/042 700/103 |
| 2010/0269111 | A1* | 10/2010 | Conte | G06Q 10/06 718/100 |
| 2011/0022362 | A1* | 1/2011 | Pritchard | G05B 17/02 703/1 |
| 2013/0212214 | A1* | 8/2013 | Lawson | G06Q 10/06315 709/217 |
| 2013/0275481 | A1* | 10/2013 | Schultze | G06F 7/544 708/200 |
| 2013/0338810 | A1* | 12/2013 | Huang | G05B 13/02 700/108 |
| 2015/0120005 | A1 | 4/2015 | Hassel et al. | |
| 2015/0254588 | A1* | 9/2015 | Kozhukhin | B22D 46/00 705/7.23 |

OTHER PUBLICATIONS

Schutz, J., "Joint optimization of production-maintenance plans based on optimal production rates," IEEE International Conference on Industrial Engineering and Engineering Management (IEEM), pp. 933-937, 2014.

Haoues, M., Dahane, M., Mouss, K.N., and Rezg, N., "Production planning in integrated maintenance context for multi-period multi-product failure-prone single-machine," IEEE 18th Conference on Emerging Technologies & Factory Automation (ETFA), pp. 1-8, 2013.

Howell, D., "Taking control of energy use," AMS, http://www.automotivemanufacturingsolutions.com/technology/taking-control, Dec. 11, 2014.

Extended EP Search Report for EP Application No. 16205764 dated May 30, 2017; 8 pages.

* cited by examiner

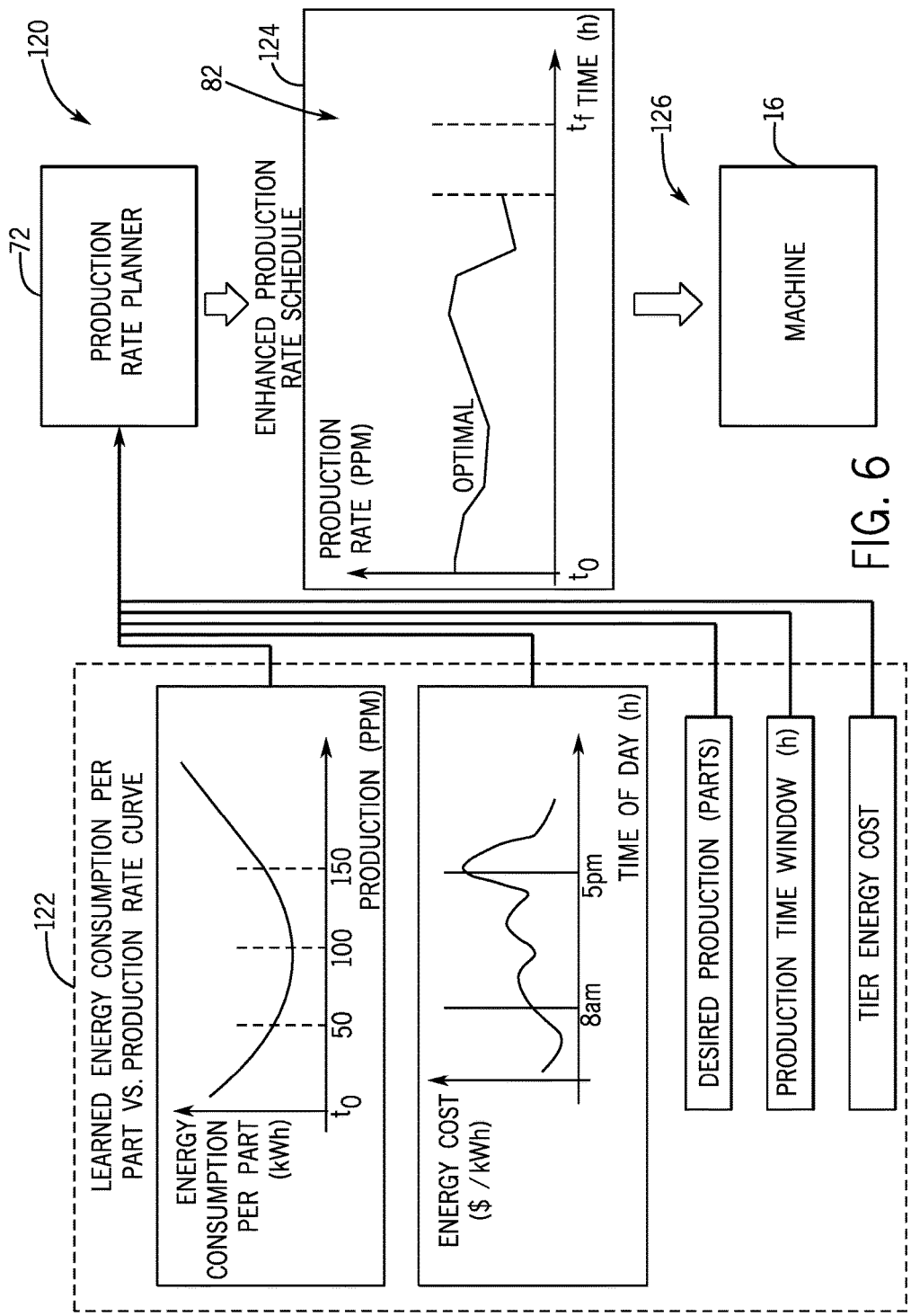

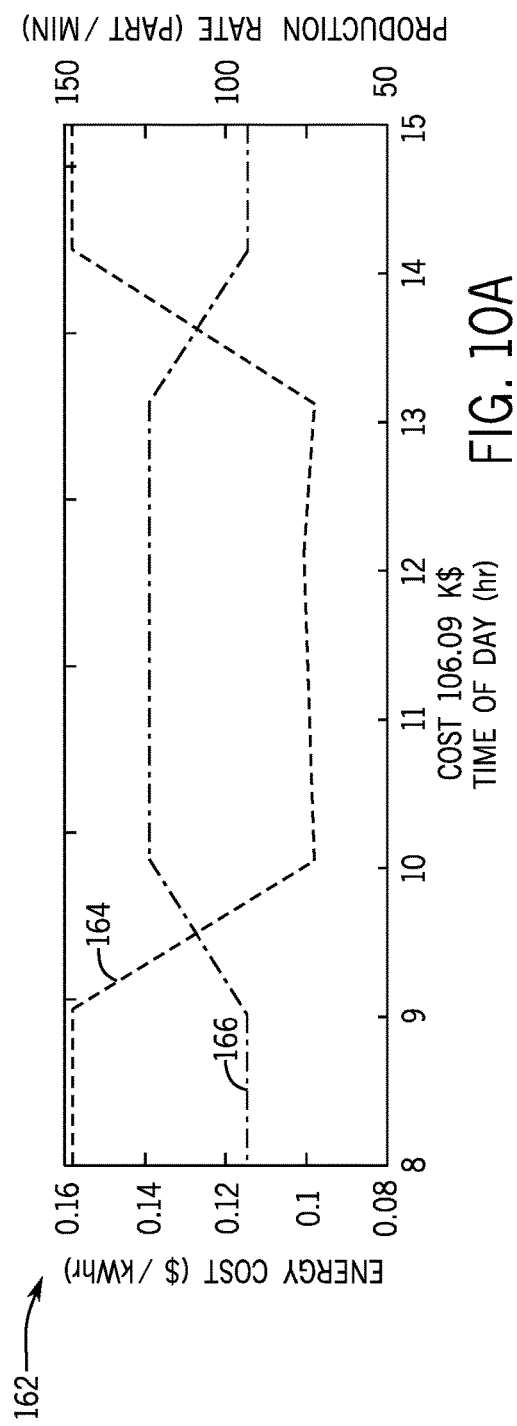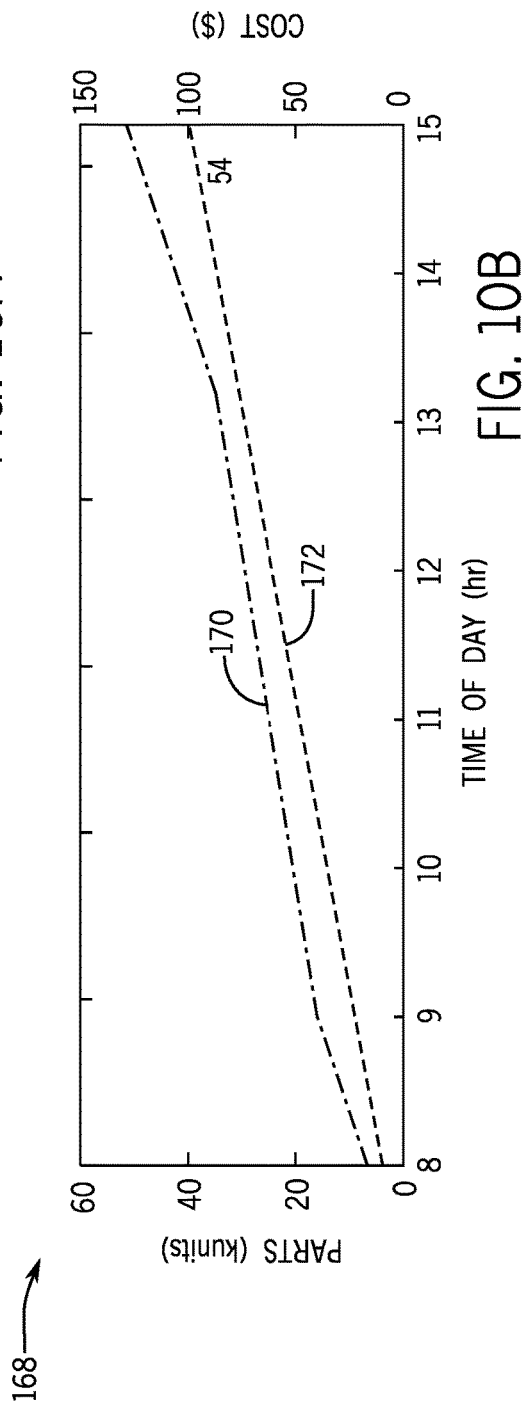
FIG. 10A
FIG. 10B

SYSTEMS AND METHODS TO ENHANCE MACHINE DESIGNS AND PRODUCTION RATE SCHEDULES FOR MINIMIZED ENERGY COST

BACKGROUND

The present disclosure relates generally to industrial automation applications and, more particularly, to systems and methods to enhance machine designs and production rate schedules for minimized energy cost.

Two phases related to machines in industrial applications include a design phase and an operation phase. During the design phase, a user may design a motion profile, and size and select actuators, drives, and load transmission component axes to be implemented in the machine. Also, machine application code is developed during the design phase. During the operation phase, machine operation occurs and the machine application code is executed. For example, the machine application code may execute a production rate schedule that results in a certain energy cost.

Certain studies estimate that energy cost is greater than eighty percent of the total machine lifecycle cost in industrial automation applications. Further, energy costs continue to rise in certain parts of the world, with Europe leading the way with the highest costing energy. Of the eighty percent, a significant cost is the energy consumption associated with the machine production rate, drive/actuator sizing solution, the time-of-day energy cost, and/or tiered energy costs. In some instances, the drive/actuator sizing solution that is selected and/or the machine application code that is developed during the design phase of the machine may lead to inefficient energy usage in the operation phase. Further, machine application code that follows set production rate schedules during the operation phase in different regions of the world may produce different energy costs due to varying time-of-day energy costs for those regions. Additionally, in some regions of the world, such as China, if the energy usage exceeds a specific threshold for a tiered energy cost, the increased energy costs of a subsequent tiered energy cost are applied. Accordingly, it may be desirable to design and control machines more efficiently.

BRIEF DESCRIPTION

In one embodiment, a tangible, non-transitory computer readable medium stores instructions that, when executed by a processor, are configured to cause the processor to receive a first set of inputs including a motion profile of a machine, a mechanical design of the machine, or both, generate a number of axis solutions for one or more actuators, drives, and load transmission components based on a model using the first set of inputs, generate a production rate versus amount of energy consumed per part curve for each of the number of axis solutions, and display the production rate versus amount of energy consumed per part curves for each of the number of axis solutions. One of the curves includes a point on the curve indicative of a lowest amount of energy consumed for a desired production rate range.

In one embodiment, a method includes receiving, via a processor, one or more inputs comprising a motion profile of a machine in an industrial application, a mechanical design of the machine, time-of-day energy costs, tiered energy costs, a desired number of parts to be produced by the machine, a production time window, or some combination thereof. The method also includes generating, via the processor, a number of axis solutions for one or more actuators, drives, load transmission components, or some combination thereof, using a model of the machine based on at least a subset of the one or more inputs. The method also includes selecting, via the processor, one of the number of axis solutions using an objective function based at least on energy cost versus time. The energy cost is estimated by simulating the machine running an enhanced production rate schedule. The enhanced production rate schedule includes a schedule of production rates that produce the lowest energy cost for the production time window while enabling the desired number of parts to be produced by the machine. The method also includes displaying, via the processor, an energy cost versus time curve associated with the enhanced production rate schedule employed by the selected axis solution.

In one embodiment, a system includes a first machine in a first plant, and a first control/monitoring device communicatively coupled to the first machine and comprising a first processor. The first processor is configured to receive one or more inputs comprising an energy consumption versus production rate curve, time-of-day energy costs, cumulative energy threshold costs, a desired number of parts to be produced by the first machine, a production time window, or some combination thereof, and generate an enhanced production rate schedule using an objective function based at least on a subset of the one or more inputs. The enhanced production rate schedule comprises a schedule of production rates that produce the lowest energy cost for the production time window while enabling the desired number of parts to be produced by the first machine according to the objective function.

DRAWINGS

These and other features, aspects, and advantages of the present disclosure will become better understood when the following detailed description is read with reference to the accompanying drawings in which like characters represent like parts throughout the drawings, wherein:

FIG. 6 is a block diagram of a method for generating, displaying, and implementing an enhanced production rate schedule, in accordance with embodiments presented herein;

FIG. 10A is a graph depicting an enhanced production rate schedule to produce 54,000 parts in relation to the time-of-day energy costs over an 8 hour period, in accordance with embodiments presented herein;

FIG. 10B is a graph depicting the number of parts produced in relation to the energy costs over the 8 hour period, in accordance with embodiments presented herein.

DETAILED DESCRIPTION

Figure 1:
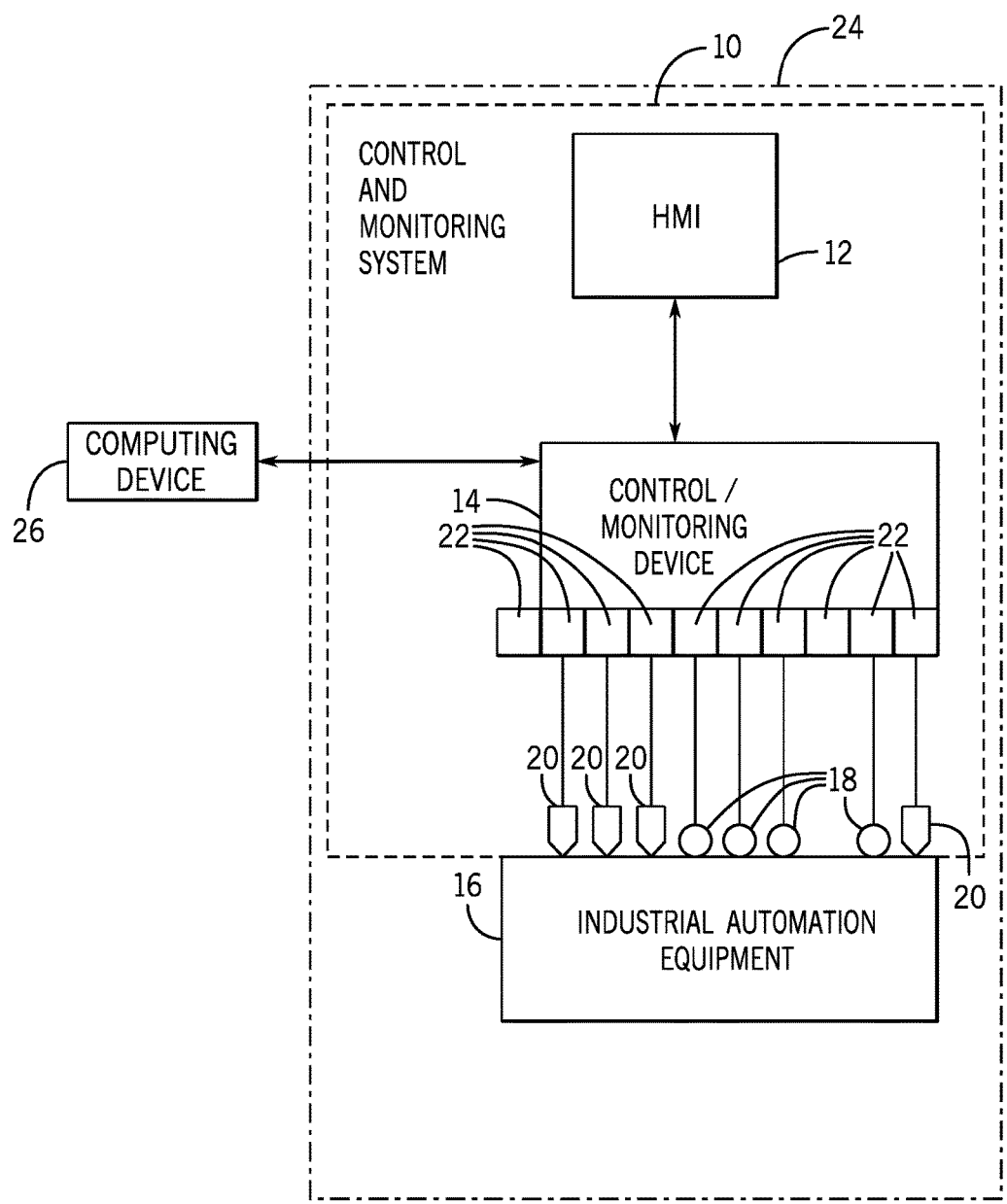
FIG. 1 is a diagrammatical representation of an exemplary control and monitoring system, in accordance with embodiments presented herein.

Embodiments of the present disclosure generally relate to systems and methods to enhance the design and production rate scheduling of industrial automation equipment (e.g., one or more machines) for minimized energy costs. The techniques may be implemented as software (e.g., computer instructions) stored on non-transitory media included in a human-machine interface, a control/monitoring device (e.g., automation controller), and/or any suitable computing device. In some embodiments, the software may be executed when the industrial automation equipment is offline (e.g., when not communicatively coupled to industrial automation equipment that is currently operating) or the software may be executed when the industrial automation equipment is online (e.g., when communicatively coupled to industrial automation equipment that is currently operating). In some embodiments, the techniques may include finding a near minimum solution to an optimization problem represented as a constrained nonlinear multivariable function, which is described in detail herein.

Embodiments of the present disclosure relate to two phases associated with industrial automation equipment (e.g., machines): a design phase and an operation phase. It should be noted that embodiments associated with the design phase may be exclusive from embodiments associated with the operation phase. Thus, existing machine designs may take advantage of the embodiments associated with the operation phase disclosed herein. In general, the software utility that implements the design phase embodiments may be executed on a computing device when the industrial automation equipment is offline (e.g., prior to the industrial automation equipment is built), and the software utility that implements the operation phase embodiments may be executed on a control/monitoring device communicatively connected to the industrial automation equipment while the equipment is online, as described further below.

During the design phase (e.g., when the industrial automation equipment is offline), the techniques may include sizing and selecting an axis solution that includes one or more actuators (e.g., motor), drives, and load transmission components (e.g., gearbox, ball screw, belt drive systems, spur gear systems, etc.) that minimize the energy consumption of the industrial automation equipment for a particular production rate range. In some embodiments, the industrial automation equipment may be built according to the selected axis solution. In some embodiments, the axis solutions may be generated based at least on a motion profile of the industrial automation equipment. The motion profile may be defined as a method to describe the machine (e.g., industrial automation equipment) process in terms of velocity versus time, and/or position versus time of mechanical components of the industrial automation equipment.

Further, an enhanced production rate schedule may be generated for the selected axis solution. The enhanced production rate schedule may include a schedule of production rates for various times over a time period. The selection of the axis solutions may be based on a generated curve of production rates versus energy consumption for the various axis solutions. That is, the axis solution for the one or more actuators, drives, and load transmission components that has the lowest energy consumption may be displayed and/or indicated on a display. In such an instance, the curve displaying the lowest energy consumption for the desired production rate range may be selected as the desired axis solution. In another example, the selection of the axis solution may be based on a generated curve of production rates versus energy consumption per part for the various axis solutions. In such an instance, the curve displaying the lowest energy consumption per part for the desired production rate may be selected as the desired axis solution. In some embodiments, the curves may be displayed in a graphical and/or tabular format.

Additionally, the one or more enhanced production rate schedules that are generated for the respective axis solutions may be used to visualize energy savings over a certain time period (e.g., years). That is, another view that may be used to select the one or more axis solutions that minimize energy cost may include total cost of ownership (e.g., energy cost plus bill of materials (BOM) cost) versus time. For example, an axis solution that includes a higher BOM cost may not exhibit a minimal energy cost per part versus production rate but may still result in a lower total cost of ownership after multiple years of operation. Further, the one or more enhanced production rate schedules may be sent (e.g., transmitted) to a control/monitoring device connected to the industrial automation equipment to be executed when the equipment is built and is online.

During the operation phase (e.g., the industrial automation equipment is online), the techniques may include determining, visualizing, selecting, and implementing one or more enhanced production rate schedules that include a schedule of production rates for the industrial automation equipment that reduces energy costs, while achieving the desired production objectives (e.g., number of parts, production time, downtime, and so forth). It should be noted that the production rate scheduling may be performed for one machine or multiple machines located globally with different regional time-of-day energy costs, tiered energy cost models, and time zones. In some embodiments, the time-of-day energy costs and/or cumulative energy threshold costs may be considered when determining the production rate schedule with a desired production rate that reduces energy consumption and costs. Further, the techniques may dynamically adjust the production rate schedule during operation to achieve a desired production rate according to the time-of-day energy cost, cumulative energy threshold costs, and/or a user defined set of long term production objectives (e.g., 5,000 parts in 10 hours). To that end, the techniques may also include determining and displaying a visual indication of the production rate schedule (e.g., production rate versus time) to achieve the desired production objectives at the minimized energy cost. The techniques may also include learning energy usage of the industrial automation equipment using a user defined range of production rates. For example, in some operation phase embodiments, the techniques may iterate through a user defined range of production rates and subsequently learn the energy usage for each respective production rate. Additional details related to learning the energy usage versus production rate curve are described below. As may be appreciated, reducing the energy consumption may result in reducing production costs to operate the industrial automation equipment.

FIG. 1 is a diagrammatical representation of an exemplary control and monitoring system 10, in accordance with embodiments presented herein. In FIG. 1, the control and monitoring system 10 is illustrated as including a human machine interface (HMI) 12 and a control/monitoring device or automation controller 14 adapted to interface with devices that may monitor and control various types of industrial automation equipment 16. It should be noted that such an interface may be facilitated by the use of certain network strategies. Indeed, an industry standard network may be employed, such as DeviceNet®, ControlNet®, EtherNet/IP®, Profinet®, EtherCAT® or the like to enable data transfer. Such networks permit the exchange of data in accordance with a predefined protocol, and may provide power for operation of networked elements. Although not depicted in FIG. 1, the control and monitoring system 10 may also include controllers, input/output (I/O) modules, motor control centers, operator interfaces, contactors, starters, drives, relays, network switches (e.g., Ethernet switches, modular-managed, fixed-managed, service-router, industrial, unmanaged, etc.), and the like. Additionally, certain power monitoring devices may be used connected at the mains alternating current (AC) input to the industrial automation equipment 16 to learn the energy consumed per part versus production rate, as described below. In some embodiments, energy may be read at each drive and aggregated to determine how much energy is consumed per part versus production rate.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include motors, protection devices, switchgear, compressors, and the like.

In certain embodiments, one or more properties of the industrial automation equipment 16 may be monitored and controlled by certain equipment for regulating control variables. For example, sensors 18 and actuators 20 may monitor various properties of the industrial automation equipment 16 and may be involved to adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP®, ControlNet®, DeviceNet®, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller 14). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items (e.g., parts). For example, the industrial applications 24 may include industries such as material handling, packaging industries, manufacturing, processing, batch processing, and the like.

In certain embodiments, the control/monitoring device 14 may include one or more software utilities capable of performing the operation phase (e.g., online) embodiments disclosed herein. For example, the software utilities executed on the control/monitoring device 14 may learn an energy consumption versus production rate curve and/or dynamically generate an enhanced production rate schedule based on the learned energy consumption versus production rate curve, time-of-day energy costs, desired number of parts to be produced, a production time window, and/or a cumulative energy threshold costs. Further, the software utilities executed on the control/monitoring device 14 may also display a visual indication of the enhanced production rate schedule (e.g., production rate versus time) to achieve the desired production objectives at the minimum energy cost, among other things.

In certain embodiments, the control/monitoring device 14 may be communicatively coupled to a computing device 26. Input and output signals generated from the control/monitoring device 14 may be communicated to the computing device 26. In one embodiment, data acquired by the industrial automation equipment 16 may be transmitted to the computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like.

In some embodiments, the computing device 26 may include one or more software utilities capable of performing the design phase (e.g., offline) embodiments, such as sizing and selecting an axis solution including one or more actuators, drives, and load transmission components for a machine that produces a minimized energy cost for a desired production rate range, generating an enhanced production rate schedule for the axis solution, generating an estimated energy cost versus time curve for the enhanced production rate schedule and axis solution, generating a total cost of ownership (e.g. energy cost per part plus bill of materials cost) versus time curve for the enhanced production rate schedule and axis solution, among other things. In some embodiments, once the industrial automation equipment 16 is built according to the axis solution and is online, the computing device 26 may send (e.g., transmit) the enhanced production rate schedule to the control/monitoring device 14 to control the industrial automation equipment 16 in accordance with the enhanced production rate schedule.

Figure 2A:
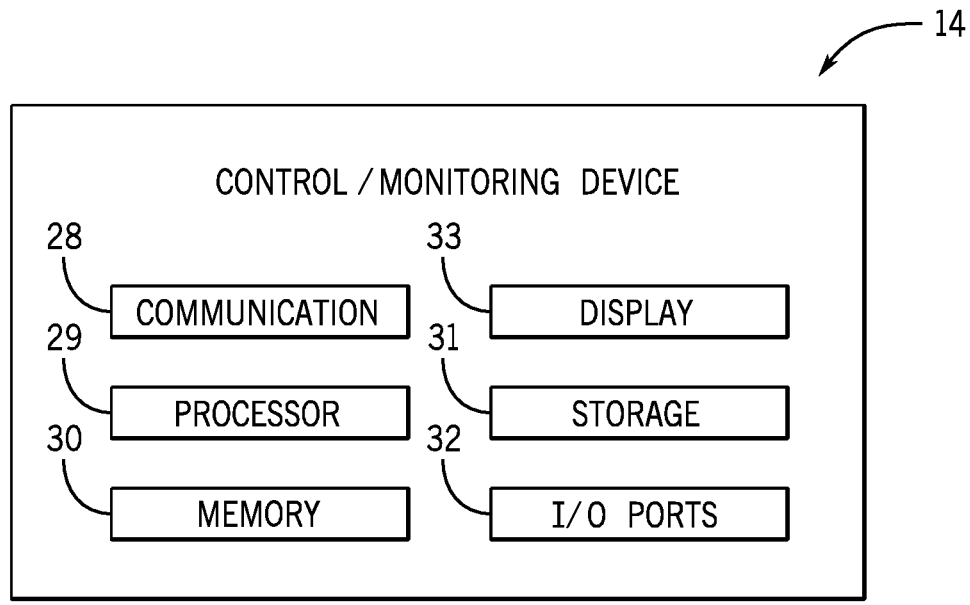
FIG. 2A is a block diagram of example components within a control/monitoring device, in accordance with embodiments presented herein.

FIG. 2A is a block diagram of example components within the control/monitoring device 14, in accordance with embodiments presented here. For example, the control/monitoring device 14 may include one or more communication components 28, one or more processors 29, one or more memory media 30, one or more storage devices 31, one or more input/output (I/O) ports 32, one or more displays 33, and the like. The communication component 28 may be a wireless or wired communication component that may facilitate communication between the industrial automation equipment 16, the HMI 12, the computing device 26, and/or other communication capable devices. Further, the communication component 28 may facilitate communication with servers and/or services owned by third-parties, such as utility providers, manufacturers of industrial automation equipment 16, and so forth. In one embodiment, relevant information (e.g., time-of-day energy costs, tiered cost models) may be retrieved from the servers and/or services and used in the techniques disclosed herein.

The processor 29 may be any type of computer processor or microprocessor capable of executing computer-executable code. The processor 29 may also include multiple processors that may perform various operations described below. The memory 30 and the storage 31 may be any suitable articles of manufacture that can serve as media to store processor-executable code, data, or the like. These articles of manufacture may represent computer-readable media (e.g., any suitable form of memory or storage) that may store the processor-executable code used by the processor 29 to perform the presently disclosed techniques. Generally, the processor 29 may execute software applications that include programs that perform the operation phase embodiments disclosed herein.

The memory 30 and the storage 31 may also be used to store the data, analysis of the data, the software applications, and the like. The memory 30 and the storage 31 may represent non-transitory computer-readable media (e.g., any suitable form of memory or storage) that may store the processor-executable code used by the processor to perform various techniques described herein. It should be noted that non-transitory merely indicates that the media is tangible and not a signal.

In one embodiment, the memory 30 and/or storage 31 may include a software application that may be executed by the processor 29 and may be used to monitor, control, access, or view one or more of the industrial automation equipment 16. As such, the control/monitoring device 14 may communicatively couple to industrial automation equipment 16 or to a respective computing device of the industrial automation equipment 16 via a direct connection between the two respective devices.

The I/O ports 32 may be interfaces that may couple to other peripheral components such as input devices (e.g., keyboard, mouse), sensors, input/output (I/O) modules 22, and the like. As discussed above, I/O modules 22 may enable the control/monitoring device 14 to communicate with the industrial automation equipment 16 or other devices in the industrial automation system via the I/O modules 22.

The display 33 may depict visualizations associated with software or executable code being processed by the processor 29. In one embodiment, the display 33 may be a touch display capable of receiving inputs from a user of the control/monitoring device 14. As such, the display 33 may serve as a user interface to communicate with the industrial automation equipment 16. The display 33 may be used to display a graphical user interface (GUI) for operating the industrial automation equipment 16, for selecting an enhanced production rate schedule that includes desired production rates over a period of time, for performing various procedures for the industrial automation equipment 16, and the like. The display 33 may be any suitable type of display, such as a liquid crystal display (LCD), plasma display, or an organic light emitting diode (OLED) display, for example. In some embodiments, the display 33 may display visualizations of the estimated energy cost versus time for a user defined range of production rates. In some embodiments, the display 33 may also display enhanced production rate schedules that include a schedule of production rates over time that achieve certain production objectives (e.g., number of parts, production time, and/or downtime) for reduced energy costs.

Although the components described above have been discussed with regard to the control/monitoring device 14, it should be noted that similar components may make up the HMI 12. Moreover, the control/monitoring device 14 may also be part of the industrial automation equipment 16, and thus may monitor and control certain operations of the industrial automation equipment 16. Further, it should be noted that the listed components are provided as example components and the embodiments described herein are not to be limited to the components described with reference to FIG. 2A.

Figure 2B:
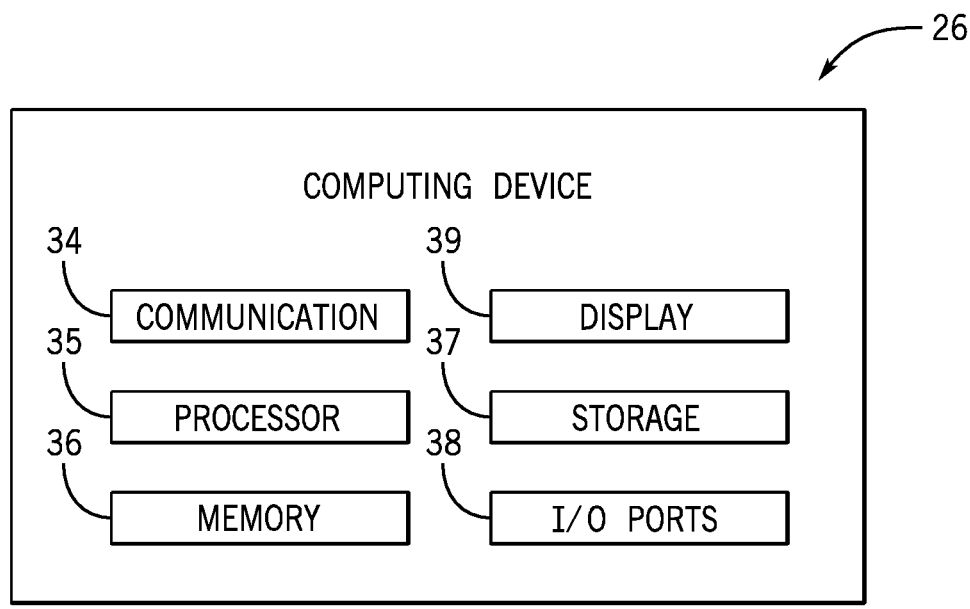
FIG. 2B is a block diagram of example components within a computing device, in accordance with embodiments presented herein.

FIG. 2B is a block diagram of example components within the computing device 26, in accordance with embodiments presented here. The computing device 26 may include similar components as the control/monitoring device 14. For example, the computing device 26 may include one or more communication components 34, one or more processors 35, one or more memory media 36, one or more storage devices 37, one or more input/output (I/O) ports 38, one or more displays 39, and the like. The memory media 36 and/or the storage 37 may store computer-executable instructions (e.g., software utilities) that, when executed by the processor 35, cause the processor 35 to perform the design phase embodiments disclosed herein. For example, the processor 35 may size and select an axis solution for one or more actuators, drives, and load transmission components that minimizes energy for a desired production rate range. In addition, the processor 35 may cause the display 39 to display visualizations (e.g., graphical and/or tabular formats) depicting the production rate versus energy consumption curve, production rate versus energy consumption per part curve, and a visualization and indication of a point on the curves and the corresponding axis solution that is optimal in some sense (e.g., the lowest energy consumption while within a desired production rate range). It should be noted that the listed components are provided as example components and the embodiments described herein are not to be limited to the components described with reference to FIG. 2B.

Figure 3:
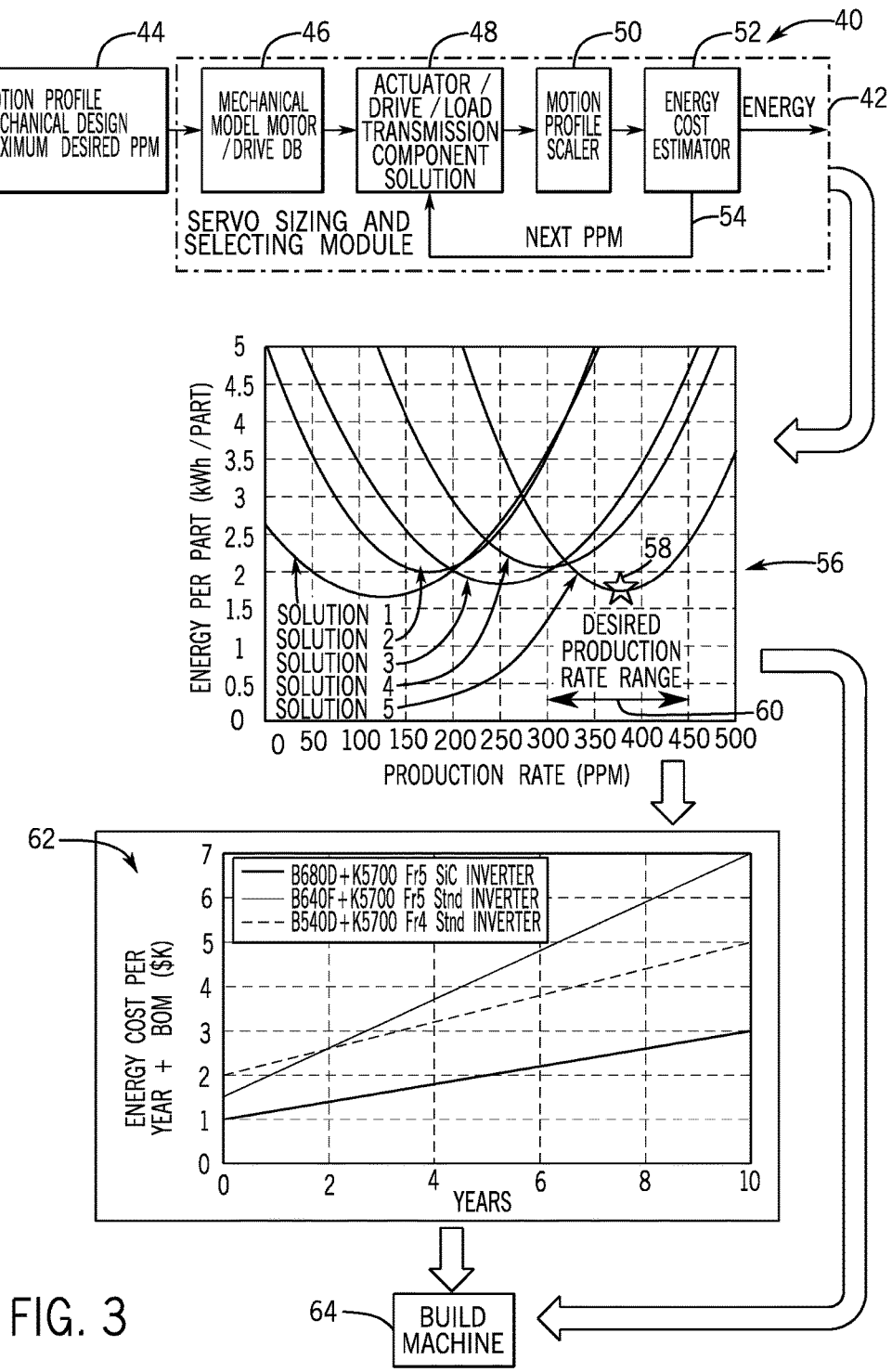
FIG. 3 is a block diagram of a method for generating, displaying, and implementing an axis solution that provides minimized energy for a desired production rate range using a servo sizing and selecting module, in accordance with embodiments presented herein.

FIG. 3 is a block diagram of a method 40 for generating, displaying, and implementing an axis solution that provides minimized energy for a desired production rate range using a servo sizing and selecting module 42 (e.g., in the form of servo sizing algorithms), in accordance with embodiments presented herein. Although the following description of the method 40 is described as being performed by the processor 35 of the computing device 26, it should be noted that the method 40 may be performed by other processors disposed on other devices that may be capable of communicating with the control/monitoring device 14, such as the HMI 12, or other components associated with the industrial application 24. Additionally, although the following method 40 describes a number of operations that may be performed, it should be noted that the method 40 may be performed in a variety of suitable orders and all of the operations may not always be performed. It should be appreciated that the method 40 may be wholly executed by the computing device 26 or the execution may be distributed between the computing device 26 and/or the control/monitoring device 14. It should be noted that the servo sizing and selecting module 42 may be implemented as computer-executable instructions as an application, a service, a module, an object, or any suitable software utility stored on the memory 36 and executed by the processor 35.

In some embodiments, the servo sizing and selecting module 42 may function as a software tool to enable a user to size and select an axis solution of one or more actuators, drives, and load transmission components for their industrial automation application 24. Criteria for selection is the actuator, drive, load transmission component combination that yields the lowest energy cost per part in the desired production rate range for the machine under design. Criteria for selection may also include bill of material (BOM) cost, physical size, drive features, product availability, and the like. Thus, in some embodiments, the method 40 may be performed by the processor 35 during a design phase when the industrial automation equipment 16 is offline. During the design phase, the servo sizing and selecting module 42 may generate one or more axis solutions including actuators, drives, and load transmission components combinations (e.g., size, type, energy rating) that meets certain production objectives (e.g., number of parts, production time, downtime) at a reduced energy cost. The axis solution that meets the desired production rate or production rate range while consuming the lowest amount of energy may be selected and implemented.

In general, each axis (e.g., actuator, drive, load transmission component) may include a unique or identical motion profile. Thus, the method 40 may use an iterative process for each axis to generate multiple axis solutions resulting in an energy cost per part versus production rate curve. Each axis solution may include a different energy cost curve and BOM cost, which allows the processor 35 to select the axis solution that results in the lowest amount of energy consumed within a user desired production rate range. Additionally, since each axis solution has a unique BOM cost, it is advantageous to generate a visualization of the machine lifecycle total cost of ownership (BOM cost plus energy cost) versus time curve over a typical life cycle (e.g., 10 to 25 years) of a machine when selecting the axis solution.

Referring now to the method 40, the servo sizing and selecting module 42 may receive various inputs 44, such as a motion profile of the industrial automation equipment 16 (e.g., machine), a mechanical design of the industrial automation equipment 16, and/or a maximum desired production rate (e.g., parts per minute (PPM)). In some scenarios, the machine process uses several actuators and drives each having unique or identical motion profiles. In some embodiments, the motion profiles may be entered graphically or via tabular entry. Additionally or alternatively, the motion profile and/or the mechanical design of the industrial automation equipment 16 may be downloaded or received from a database and/or service of a manufacturer of the industrial automation equipment 16. Some industrial automation applications 24 are position controlled, velocity controlled, and/or torque controlled. The motion profile may be selected by a user based on the type of industrial automation application 24. The techniques disclosed herein enable sizing and selecting solutions for actuators, drives, and load transmission components that reduce energy costs. In some embodiments, the sizing and selecting may be performed at a higher level by considering a collection of actuators and drives. That is, the servo sizing and enhancement module 42 may consider how drives are connected together for power sharing and the power converter type and the distribution to multiple drives in a system. Thus, benefits of the disclosed techniques may include energy usage optimization capabilities at an individual axis level and system level considering certain production objectives (e.g., production rate, number of parts, time window).

The mechanical design may include machine mechanics (e.g., load transmission components) connected to the motor. The mechanics may include a gearbox, ballscrew, and other related components. The mechanical design is considered in calculations (e.g., modeling) that size and select axis solutions of actuators, drives, and load transmission components for the industrial automation equipment 16 because the mechanical design impacts the power/energy rating of the actuators and drives, and, therefore, the physical size of the actuators and drives and the cost. Further, as discussed below, the mechanical design may also be considered when determining an enhanced production rate schedule. The maximum desired production rate (e.g., part per minute) may be defined by a user and may be any suitable number. Additionally or alternatively, the maximum desired production rate may be provided in a specification of the industrial automation equipment 16. Further, in some embodiments, the maximum desired production rate may include a range of production rates.

The servo sizing and selecting module 42 may use the inputs 44 to generate a mechanical model (block 46) of the industrial automation equipment 16. In some embodiments, the mechanical model may include one or more mathematical functions that represent the physical operational behavior of the industrial automation equipment 16 based on the motion profile and/or the mechanical design. For example, the mechanical model may use steady-state and/or dynamic equations, linear and/or nonlinear equations, differential equations, gain functions, transfer functions, and/or the like, to model the physical operational behavior of the industrial automation equipment 16 to find the axis solution that minimizes energy consumption at the desired production rate. In one particular example, the amount of torque (T) or force that is used by the industrial automation equipment 16 is a function of the inertia or mass of the mechanical system and the motion profile that is executed. Friction (Tf) and other external load forces may also be included in the equation. Thus, the torque (T) required for a rotary motor to accelerate (alpha) a load with inertia and a motor with inertia (J) is represented below:

$$T = J*\text{alpha} + Tf \qquad \text{Equation (1)}$$

It should be understood that J may include the effect of masses (m) from linear systems ($m \times r^2$). In that case, J=motor inertia+load inertia. Where the load inertia is calculated from the mechanical system characteristics (e.g., mechanical design of the load transmission components). Further, the power (P) for each axis solution is represented by the following relationship:

$$P(\text{watt}) = T*S \qquad \text{Equation (2)}$$

Where S is speed. In addition, the energy (E) for each axis is expressed by the following relationship:

$$E = \int_{t_o}^{t_f} P \, dt \qquad \text{Equation (3)}$$

Where $t_0$ is the time when the part started to be produced, $t_f$ is the time at which the part was produced, dt reflects the time interval used to integrate P. To illustrate, when computing the energy to make one part over 0.5 seconds, dt may be set to 20 milliseconds. In this example, $t_0$ equals 0 and $t_f$ may equal 0.5 seconds. The time between $t_f$ and $t_0$ may be divided in smaller intervals, which is dt. For each of the intervals, E is calculated and added together.

Further, block 46 may include accessing a motor/drive database to retrieve information related to settings, electrical specifications, type, manufacturer, or the like, of the motor/drive. For example, the motor/drive database may specify certain settings (e.g., peak current, max voltage, control loop bandwidth) of a drive to produce a desired speed, torque, direction, and horsepower of a motor that enables the industrial automation equipment 16 to produce the desired production rate.

The servo sizing and selecting module 42 may determine an axis solution (block 48) for one or more actuators, drives, and load transmission components that may be implemented in the industrial automation equipment 16 (e.g., machine) to produce a desired production rate while minimizing energy consumption. As may be understood, motion profiles for the machine and the individual actuators and drives may be cyclic. When a cycle completes, a part may be produced by the machine in a certain amount of time as dictated by the motion profile cycle time. One measure of machine performance may include the number of parts that can be produced per minute (e.g., PPM). Thus, PPM may be referred to as a speed of the machine. As the production rate of the machine (e.g., PPM) is changed, the energy consumption changes. In some embodiments, the servo sizing and selecting module 42 uses a motion profile scaler (block 50) that changes the PPM of the machine, thereby resulting in different consumptions of energy. That is, the motion profile scaler may change the motion profile in terms of amplitude and time such that a new production rate (e.g., PPM) is achieved for the particular axis solution.

In addition, the servo sizing and selecting module 42 uses an energy cost estimator (block 52) to estimate the energy cost per part for the particular axis solution that employs the production rate generated by the motion profile scale. The servo sizing and selecting module 42 may execute blocks 48, 50, and 52 in a loop (arrow 52) by generating different axis solutions and production rates and estimating the energy cost for the axis solutions employing the production rates. In some embodiments, the loop may continue to cycle and calculate energy costs for as many valid axis solutions that are found by the servo sizing and selecting module 42. Then, by plotting together and comparing the energy cost per part of various axis solutions employing different production rates, the axis solution that minimizes energy cost per part within a desired production rate range may be visually indicated and selected.

For example, the output from the motion enhancement module 42 may be used by the processor 35 to display the estimated production rate (PPM) versus energy consumption per part curve in graphical and/or tabular format on the display 39. For example, graph 56 depicts the energy per part (e.g., kilowatt-hour (kWh) per part) on the Y-axis versus the production rate (e.g., part per minute) on the X-axis. The various curves represent the resulting energy consumption per part for production rates for each axis solution (solutions 1, 2, 3, 4, 5) of one or more actuators, drives, and load transmission components. As depicted by the curves, the relationship between the energy consumption and the production rates is nonlinear. Further, the processor 35 may select and identify an optimal point 58 on the production rate versus energy consumption per part curve (solution 5) by finding a point on the curves that represents the least amount of energy consumed within a desired production rate range 60. The optimal point 58 may be found by using a mathematical function (e.g., objective function) to find the minimum amount of energy consumption that is within the desired production rate range 60. In some embodiments, the mathematical function may use a set of nonlinear and/or linear inequality constraints, nonlinear and/or linear equality constraints, or some combination thereof, as described below.

In some embodiments, as discussed above, the processor 35 may generate curves for the total cost of ownership (e.g., energy cost per year plus bill of materials (BOM)) for a machine that implements the axis solutions employing the production rate plans for typical machine lifetimes (e.g., 10 to 25 years). Then, the processor 35 may display a graph 62 depicting the total cost of ownership on the Y-axis versus time (e.g., years) on the X-axis. As depicted, the graph 62 may enable identifying axis solutions that start out costing less but end up costing more than other solutions. For example, an axis solution that has a higher BOM cost may not exhibit a minimal energy per part versus production rate curve but may result in a lower total cost of ownership after multiple years of operation, and, thus, be a more desirable solution. As may be appreciated, visualization of both the energy per part versus production rate curve and the total cost of ownership versus time curve may enable enhancing the selection of the axis solution for minimized energy considering machine production rate objectives and total cost of ownership. After the desired axis solution that meets production objectives for minimal energy or that results in the desired total cost of ownership over time is selected by the processor 35, the processor 35 may build (block 64) a machine according to the selected axis solution.

Figure 4A:
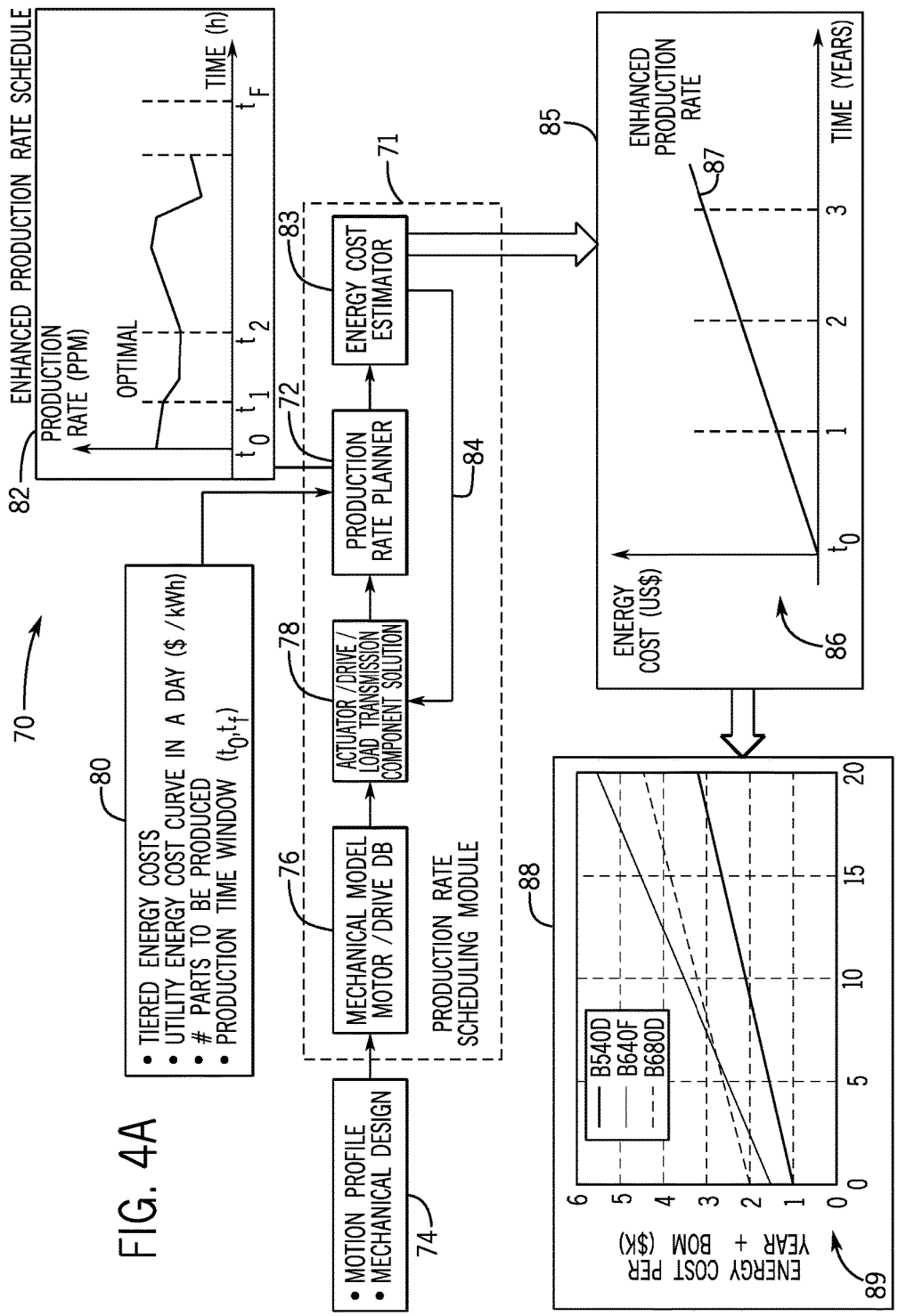
FIG. 4A is a block diagram of a method for generating and displaying an estimated energy cost versus time visualization using a production rate scheduling module including a production rate planner, in accordance with embodiments presented herein.

FIG. 4A is a block diagram of a method 70 for generating and displaying an estimated energy cost versus time visualization using a production rate scheduling module 71 including a production rate planner 72, in accordance with embodiments presented herein. Although the following description of the method 70 is described as being performed by the processor 35 of the computing device 26, it should be noted that the method 70 may be performed by other processors disposed on other devices that may be capable of communicating with the control/monitoring device 14, such as the HMI 12 or other components associated with the industrial application 24. Additionally, although the following method 70 describes a number of operations that may be performed, it should be noted that the method 70 may be performed in a variety of suitable orders and all of the operations may not be performed. It should be appreciated that the method 70 may be wholly executed by the computing device 26 or the execution may be distributed between the computing device 26 and/or the control/monitoring device 14. In some embodiments, the method 70 may be performed by the processor 35 during the design phase when the industrial automation equipment 16 is offline.

Referring now to the method 70, the production rate scheduling module 71 may receive various inputs 74, such as a motion profile of components of the industrial automation equipment 16 (e.g., machine) and/or a mechanical design of the industrial automation equipment 16. The motion profile and/or the mechanical design of the industrial automation equipment 16 may be downloaded or received from a database and/or service of a manufacturer of the industrial automation equipment 16. In some embodiments, the user may provide the motion profile and/or the mechanical design of the industrial automation equipment 16.

The production rate scheduling module 71 may use the inputs 44 to generate a mechanical model (block 76) of the industrial automation equipment 16. In some embodiments, the mechanical model can be derived by the production rate scheduling module 71 after receiving the inputs 44 related to the mechanical components that will be connected to the actuator. The mechanical model may include one or more mathematical functions that represent the physical operational behavior of the industrial automation equipment 16 based on the motion profile and/or the mechanical design. For example, the mechanical model may use steady-state and/or dynamic equations, linear and/or nonlinear equations, differential equations, gain functions, transfer functions, and/or the like to model the physical operational behavior of the industrial automation equipment 16 to find the enhanced production rate. Further, block 76 may include accessing a motor/drive database to retrieve information related to settings, type, electric and mechanical specifications, manufacturer, or the like of the motor/drive. For example, the motor/drive database may specify certain settings (e.g., peak current, max voltage, control loop bandwidth) of a drive to produce a desired speed, torque, direction, and horsepower of a motor that enables the industrial automation equipment 16 to produce the desired production rate.

The production rate scheduling module 71 may determine an axis solution for the actuators, drives, and load transmission components that are connected to the industrial automation equipment 16 (block 78). Further, the axis solution may be passed to the production rate planner 72. It should be noted, that the production rate planner 72 may be in the form of control algorithms implemented as computer instructions stored on the memory 36 and executable by processor 35. Although the production rate planner 72 is shown as included as a function or sub-module of the production rate scheduling module 71, it should be understood that the production rate planner 72 may be implemented as a separate function or module referenced by the production rate scheduling module 42. For example, the production rate planner 72 may be locally referenced or invoked via a remote procedure call (e.g., from a service). Further, in some embodiments, the production rate planner 72 may reside in the memory 30 of the control/monitoring device 14 and be executed by the processor 29 to dynamically adjust the production rate of the machine based on time-of-day energy costs, cumulative energy threshold costs, and/or user defined set of production objectives during the operation phase, as described in detail below.

The production rate planner 72 may receive various inputs 80. For example, the production rate planner 72 may receive the tiered energy costs (e.g., cumulative energy threshold costs), time-of-day energy costs (e.g., curve) in a day (e.g., currency (e.g., dollars, euro, or other currencies) per kilowatt-hour), the number of parts to be produced, a production time window (e.g., $t_0$ to $t_f$), and so forth. In some embodiments, the inputs 80 may be defined by a user of the computing device 26. In some embodiments, the inputs 80 may be received from an external source. For example, the time-of-day energy costs and/or the tiered energy costs may be received from a utility provider (e.g., automatically from a website). The time-of-day energy costs and/or the tiered energy costs may vary based upon the geographical location of the industrial automation equipment 16.

The tiered energy cost may include a cost model with various tiers that are based on a billing cycle or annual contract. Thus, the historical power/energy usage may be maintained from the start of the billing cycle and may be used as a constraint in cost function used by the production rate planner 72. At the end of the billing cycle, the accumulated energy/power value may be reset to zero. The tiered energy cost information may be obtained from the utility provider (e.g., automatically via a website) or entered by the user. The tiers may specify amounts of energy usage and an energy cost to apply for energy used in each respective tier. To illustrate, the cost model may include four tiers, however any suitable number of tiers may be used. A first tier may include a baseline allocation with the cheapest energy cost (e.g., 15 cents), a second tier may include a second energy allotment with a more expensive energy cost (e.g., 20 cents), a third tier may include a third energy allotment with a more expensive energy cost (e.g., 25 cents), and a fourth tier may include a fourth energy allotment with the most expensive energy cost (e.g., 30 cents). As may be understood, when an energy allotment is exceeded in one tier, the cost of energy is increased for the energy usage in the subsequent tier.

The production rate planner 72 may account for the time-of-day energy costs and/or tiered energy costs in determining the production rates throughout the time window (e.g., $t_0$ to $t_f$) to reduce the energy consumption during time periods with high energy cost, while still producing the desired number of parts. For example, the production rate planner 72 may output an enhanced production rate schedule 82 that includes a schedule of production rates over the production time window that account for the time-of-day energy costs. The output production rate schedule may include a first production rate (e.g., PPM1) at a certain time (e.g., 8 AM), a second production rate (e.g., PPM2) at another time (e.g., 9 AM), and so forth. As depicted, the production rate decreases at $t_1$ when the energy costs are particularly high at that time of day, and then the production rate increases at $t_2$ when the energy costs decrease. In some embodiments, the production rate schedule may be considered a lookup table of production rates (e.g., PPMs) at various times. In some embodiments, an existing machine may implement a production rate schedule that defines the amount of parts to be produced for a given timeframe dictated by inventor levels and/or new order levels.

The production rate planner 72 may use an objective function (e.g., cost function), such as a constrained nonlinear multivariable function, to find an enhanced production rate schedule for a machine built according to the input axis solution that satisfies the production objectives for minimized energy cost. An example objective function is expressed by the following relationship:

$$\text{Cost}(\$) = \sum \text{Production Rate}\left(\frac{\text{parts}}{\text{min}}\right) \times 60\left(\frac{\text{min}}{\text{hour}}\right) \times \text{Energy Consumption}\left(\frac{\text{kWh}}{\text{parts/min}}\right) \times \text{Utility Cost}\left(\frac{\$}{\text{kWh}}\right) \quad \text{(Equation 4)}$$

In addition, a constraint equation may be expressed by the following relationship:

$$\text{Total Required Parts} = \sum \text{Production Rate}\left(\frac{\text{parts}}{\text{min}}\right) \times 60\left(\frac{\text{min}}{\text{hour}}\right) \quad \text{(Equation 5)}$$

The production rate planner 72 may search for an enhanced production rate schedule for the axis solution that minimizes the objective function using the constraint equation, as described further below. The objective function may be constrained by various nonlinear and/or linear equality constraints and/or nonlinear and/or linear inequality constraints. The nonlinear inequality and equality constraints may include functions (e.g., nonlinear) that return vectors, and the linear inequality and equality constraints may include variables that are matrices. The objective function may also be bound by certain limits (e.g., passed as vectors or matrices) for the production rate. Further, the objective function variables may represent the production rate, the energy consumption, and/or the energy costs (e.g., fixed cost, time-of-day energy costs, and/or tiered energy costs).

It should be understood that the user may select which constraints to apply in the objective function when the processor 30 is determining the enhanced production rate schedule 82. For example, for the energy cost constraint, the user may select to use the fixed cost, time-of-day energy cost, and/or tiered energy cost. The selection of which energy cost constraints to use may affect whether the enhanced production rate schedule can achieve the production objectives. For example, if the tiered energy cost is selected as one of the energy cost constraint, the production rate planner 72 may generate an enhanced production rate plan 82 that slows the production rates of the machine 16 down at the end of the month to avoid increased energy costs by exceeding an energy allotment of a tier. However, the decreased production rate may not be suitable to meet the production objectives defined. Further, using the time-of-day energy cost may result in a similar reduction in production rate. Thus, the tiered energy cost and time-of-day energy costs may be optional constraints that may be removed from the cost function as desired so that an enhanced production rate schedule 82 may be generated that satisfies the production objectives.

Figure 4B:
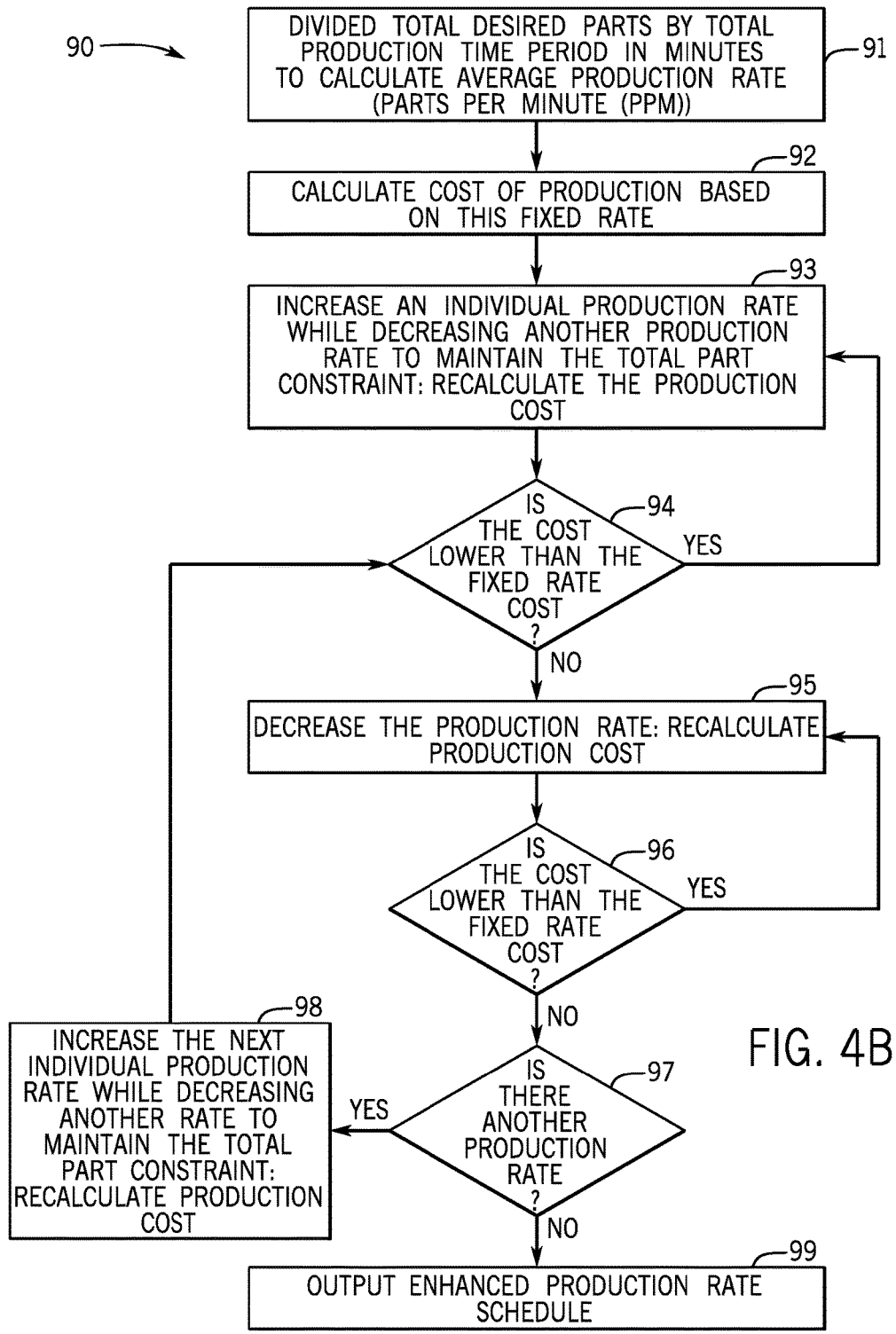
FIG. 4B depicts a block diagram of a method for generating an enhanced production rate schedule that minimizes energy cost while meeting production objectives using an objective function, in accordance with embodiments presented herein.

To illustrate the optimization algorithm implemented by the production rate planner 72, FIG. 4B depicts a block diagram of a method 90 for generating an enhanced production rate schedule 82 that minimizes energy cost while meeting production objectives (e.g., number of parts produced in a production time window) using the objective function, in accordance with embodiments presented herein. Although the method 90 described below uses a minimization function to obtain the enhanced production rate schedule 82, it should be noted that any suitable optimization algorithm (e.g., dynamic programming, quadratic programming, linear programming, gradient programming, simplex method, etc.) may be used depending on the nature of the problem (e.g., linear/non-linear constraints, end-point constraints, time constraints, multi-variable constraints, etc.). Also, although the method 90 is described as being performed by the production rate planner 72, it should be noted that the method 90 may be a separate application, service, object, or the like. In some embodiments, in the design phase, the method 90 may be implemented as computer instructions stored in the memory 36 and executed by the processor 35 of the computing device 26. In some embodiments, in the operation phase, the method 90 may be implemented as computer instructions stored in the memory 30 and executed by the processor 29.

Generally, the enhanced production rate schedule 82 may be obtained by optimizing the objective function (Equation 4) by adjusting the production rate values up and down until a minimum cost is achieved while ensuring that the constraint equation (Equation 5) is satisfied. Referring now to the method 90, the production rate planner 72 may divide (block 91) the total desired parts by the total production time period in minutes to calculate an average production rate in parts per minute (PPM). The production rate planner 72 may also calculate (block 92) the cost of production based on this fixed rate using the objective function. The production rate planner 72 may then increase (block 93) an individual production rate while decreasing another production rate to maintain the total part constraint using the constraint function and then recalculate the production cost using the object function.

Next, the production rate planner 72 may determine (block 94) whether the new production cost is lower than the fixed rate cost. If the new production cost is lower than the fixed rate cost, then the production rate planner 72 may repeat block 93 until the production cost is not lower than the fixed rate cost. If the new production cost is not lower than the fixed rate cost, then the production rate planner 72 may decrease (block 95) the production rate and recalculate the production cost. The production rate planner 72 may determine (block 96) whether the new production cost is lower than the fixed rate cost. If the new production cost is lower than the fixed rate cost, then the production rate planner 72 may repeat block 95 until the production cost is not lower than the fixed rate cost. If the new production rate cost is not lower than the fixed rate cost, then the production rate planner 72 may determine (block 97) whether there is another production rate.

If there is another production rate, then the production rate planner 72 may increase (block 98) the next individual production rate while decreasing another rate to maintain the total part constraint using the constraint equation and recalculate the production cost using the objective function. If there is not another production rate, then the production rate planner 72 may output the enhanced production rate schedule 82.

Returning to FIG. 4A, in some embodiments, the production rate scheduling module 71 may use an energy cost estimator (block 84) to estimate the energy cost of the production rates at the particular time of day for a given period of time (e.g., years). As noted above, the energy cost estimator 84 may estimate the energy cost over the years when an input axis solution employs the enhanced production rate schedule. The energy cost estimator 84 may be implemented as computer instructions stored on the memory 36 and executable by processor 35. It should also be noted that using an enhanced production rate schedule that accounts for energy consumption when reducing energy costs while producing a desired number of parts may be particularly beneficial over using a fixed production rate that does not account for energy consumption. The production rate scheduling module 71 may loop (arrow 86) back to generating another enhanced production rate schedule for as many valid axis solutions found and estimate the energy over time for each of the solutions employing the respective production rate schedules. In some embodiments, the energy cost estimator may also estimate the energy for each axis solution without the enhanced production rate schedule. The production rate schedule module 71 may plot together and compare the energy cost over time for various axis solutions to enable identification and selection of the axis solution that results in the minimized energy cost while still meeting production objectives. It should be noted that the benefit of employing the enhanced production rate schedule in the machine 16 may be evaluated by comparing the energy cost versus time curve for each axis solution with and without the enhanced production rate schedule.

To illustrate, the energy cost estimator may output the estimated energy cost for the enhanced production rate schedule over the period of time and the processor 35 may display the information in a visualization (block 88). The visualization may be in graphical and/or tabular format. As depicted, the visualization is a graph 90 depicting the estimated energy cost (e.g., dollars) on the Y-axis versus the period of time (e.g., years). Line 92 represents the estimated energy costs of the enhanced production rate schedule applied to the axis solution over the period of time. The graph 90 may enable a user to analyze the expected energy cost of a machine built according to the axis solution that employs the enhanced production rate schedule over the expected lifetime of the machine. In addition, a visualization may be generated and displayed by the processor 35 (block 89) that includes a graph 96 depicting the total cost of ownership (e.g., energy cost per year plus a (BOM cost (e.g., thousands of dollars)) on the Y-axis versus the time (e.g., years) on the X-axis. This additional view, may further enable a user to analyze the total cost of ownership of the machine built according to the axis solution employing the enhanced production rate schedule over the expected lifetime of the machine. In some embodiments, the enhanced production rate schedule may be sent (e.g., transmitted) to the control/monitoring device 14 to be executed when a machine built according to the axis solution is online. Execution of the production rate schedule may cause machine application code to execute per that production rate schedule.

Figure 5:
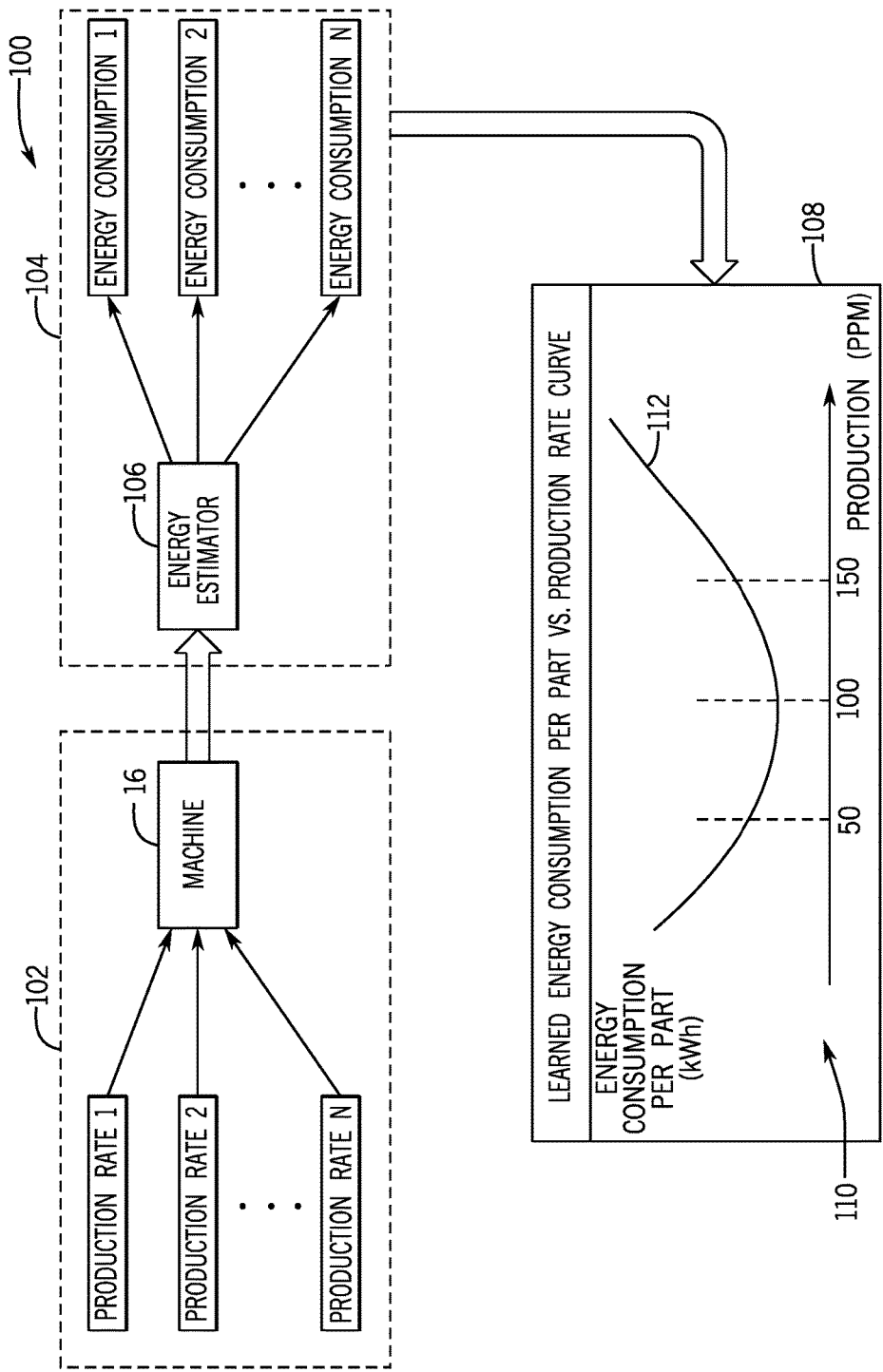
FIG. 5 is a block diagram of a method for learning energy consumption based on a number of production rates, in accordance with embodiments presented herein.

FIG. 5 is a block diagram of a method 100 for learning energy consumption based on a number of production rates, in accordance with embodiments presented herein. Although the following description of the method 100 is described as being performed by the processor 29 of the control/monitoring device 14, it should be noted that the method 100 may be performed by other processors disposed on other devices that may be capable of communicating with the industrial automation equipment 16, such as the computing device 26, the HMI 12, or other components associated with the industrial application 24. Additionally, although the following method 100 describes a number of operations that may be performed, it should be noted that the method 100 may be performed in a variety of suitable orders and all of the operations may not be performed. It should be appreciated that the method 100 may be wholly executed by the control/monitoring device 14 or the execution may be distributed between the computing device 26 and/or the control/monitoring device 14. In some embodiments, the method 100 may be performed by the processor 29 during an operation phase when the industrial automation equipment 16 is online.

Referring now to the method 100, the processor 29 may iterate through a range of user defined range of production rates (production rates 1, 2, n) by controlling a singular or multitude of actuators, drives, load transmission components as dictated by the specific machine 16 design that enable the industrial automation equipment 16 (e.g., machine) to produce the desired production rate (block 102). The processor 29 may monitor the amount of energy consumed by the industrial automation equipment 16 during operation, and estimate the amount of energy consumed per part for each respective production rate (block 104). In some embodiments, an energy estimator may receive data from one or more current and/or voltage sensors 18 attached to the industrial automation equipment 16 that enables determination of the amount of energy consumed per part. Using the production rates and the associated amounts of energy consumed per part, the processor 29 may generate and/or display a learned energy consumption per part versus production rate curve (block 108). The visualization of the learned energy consumption per part versus production rate curve may be in graphical and/or tabular format. As depicted, graph 110 shows the energy consumption (e.g., kilowatt-hour) per part on the Y-axis versus the production rate (e.g., part per minute) on the X-axis. The nonlinear curve 112 shows that the amount of energy consumption per part decreases between 0 PPM and 100 PPM, and then increases from 100 PPM forward. The decrease in energy consumption per part from 0 PPM to 100 PPM may be at least due to the industrial automation equipment 16 being less efficient at startup and increasing in efficiency as the machine continues to operate. However, at a certain point (e.g., 100 PPM), the amount of energy consumed begins to increase as the industrial automation equipment 16 produces more parts.

FIG. 6 is a block diagram of a method 120 for generating, displaying, and implementing an enhanced production rate schedule 82, in accordance with embodiments presented herein. Although the following description of the method 120 is described as being performed by the processor 29 of the control/monitoring device 14, it should be noted that the method 120 may be performed by other processors disposed on other devices that may be capable of communicating with the industrial automation equipment 16, such as the computing device 26, the HMI 12, or other components associated with the industrial application 24. Additionally, although the following method 120 describes a number of operations that may be performed, it should be noted that the method 120 may be performed in a variety of suitable orders and all of the operations may not be performed. It should be appreciated that the method 120 may be wholly executed by the control/monitoring device 14 or the execution may be distributed between the computing device 26 and/or the control/monitoring device 14. In some embodiments, the method 120 may be performed by the processor 29 during an operation phase when the industrial automation equipment 16 is online. Further, the method 120 may be performed by the production rate planner 72 described above that is stored in the memory 30 of the control/monitoring device 14.

Referring now to the method 120, the production rate planner 72 may receive various inputs, such as the learned energy consumption per part versus production rate curve (e.g., a non-linear curve representing energy usage (or cost) versus PPM), the time-of-day energy costs for a day defined by the utility company, a desired number of parts to be produced, a production time window (e.g., hours), and/or tiered energy cost (e.g., cumulative energy threshold costs) (block 122). This time window may also include intervals of time when the machine 16 should stop for various purposes such as maintenance, operator break, inspection, and cleaning. As discussed above, the energy consumption per part versus production rate curve may be generated based on monitoring energy usage for various production rates when the machine 16 is operational. In some embodiments, the energy consumption per part versus production rate curve may be received from the computing device 26, database, or from the user. The time-of-day energy costs and/or the tiered energy costs may be received from the utility provider and/or defined by the user. In some embodiments, the time-of-day energy costs may be fixed and updated on a yearly basis or depending on the season, or the time-of-day energy cost may be updated in real-time (e.g., automated cost retrieval from the utility website). Also, the desired number of parts to produce and the production time window may be defined by the user.

The production rate planner 72 may use the inputs in the objective function discussed above to select one of a number of production rate schedules that includes a schedule of production rates that produce the lowest energy cost for the production time window while still enabling the desired number of parts to be produced by the industrial automation equipment 16. That is, the objective function may be used to select the enhanced production rate schedule 82 to apply over a desired time period that reduces the amount of energy consumed, and, therefore, the cost of energy for producing the desired amount of parts. The processor 29 may display the enhanced production rate 82 on the display 38 in graphical and/or tabular format (block 124). In some embodiments, the user may select the enhanced production rate schedule 82 to apply to control the axis solution (e.g., actuators, drives, and load transmission components) or the enhanced production rate schedule 82 may be automatically selected by the processor 29 to control the axis solution to enable the industrial automation equipment 16 to meet the production objectives while reducing energy consumption (block 126).

Figure 7A:
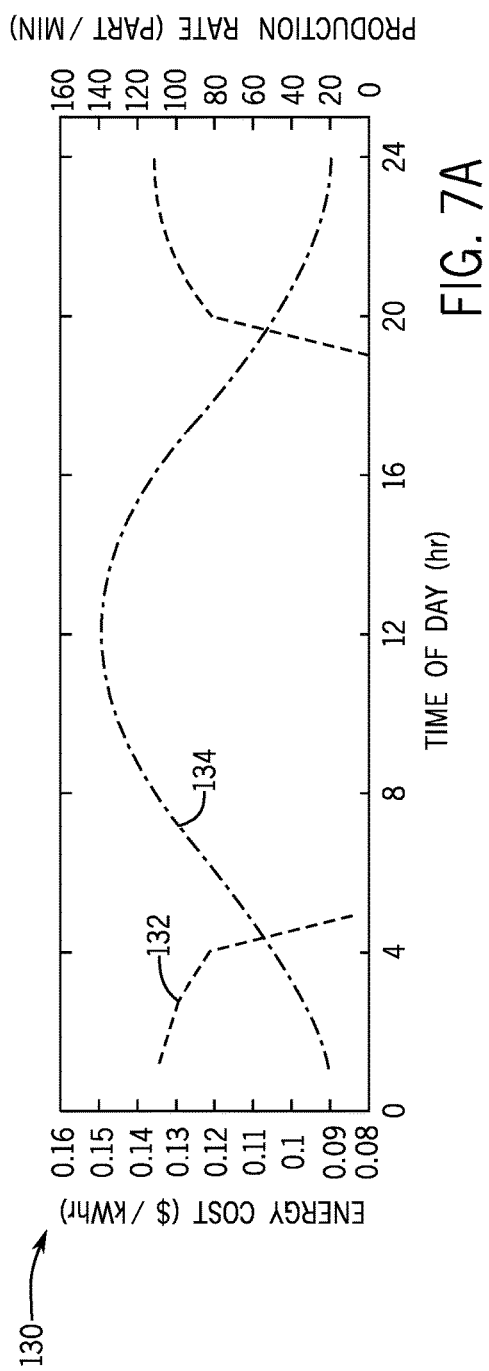
FIG. 7A is a graph depicting an enhanced production rate schedule to produce 54,000 parts in relation to the time-of-day energy costs over a 24 hour period, in accordance with embodiments presented herein.

FIG. 7A is a graph 130 depicting an enhanced production rate schedule 82 (represented by line 132) to produce 54,000 parts in relation to the time-of-day energy costs (represented by line 134) over a 24 hour period, in accordance with embodiments presented herein. The energy cost is measured in dollars per kilowatt-hour and the production rate is measured in parts per minute. As discussed above, the enhanced production rate schedule 82 may be generated by the production rate planner 72 based on inputs, such as the learned energy consumption per part versus production rate curve, the time-of-day energy costs, the tiered energy costs, and/or production objectives (e.g., desired number of parts to be produced, production time window). The enhanced production rate schedule 82 may include a schedule of production rates for the industrial automation equipment 16 at each time of the production time window. It should be understood that the graph 130 may be displayed by the control/monitoring device 14, the HMI 12, and/or the computing device 26. Also, the enhanced production rate schedule 132 may be applied to the axis solution (e.g., actuators, drives, and load transmission components) to control the industrial automation equipment 16 to meet the production objectives (e.g., 54,000 parts in 24 hours) at a reduced energy cost by taking into account the time-of-day energy costs, fixed energy cost, and/or tiered energy cost.

As depicted, the energy cost begins at 0:00 around 0.09 dollars per kilowatt-hour and gradually rises until it peaks around 0.15 dollar per kilowatt-hour at 12:00. Then, the energy cost gradually decreases back to 0.09 dollars per kilowatt-hour at 24:00. The enhanced production rate schedule 132 begins at 0:00 around 120 parts per minute (PPM) and gradually decreases in PPM as the energy cost rises until 4:00 when the production rate decreases significantly to 0 at approximately 5:00. As shown, the production rate remains at 0 during the hours of the day that the energy cost is above approximately 0.11 dollar per kilowatt-hour. The production rate increases significantly around 19:00 to 20:00 when the energy cost is approximately 0.11 dollar per kilowatt-hour. The production rate planner 72 may use the objective function discussed above to select the production rates at the times of the day that meet the production objectives for lowest energy cost, thereby resulting in the enhanced production rate schedule 132 displayed.

Figure 7B:
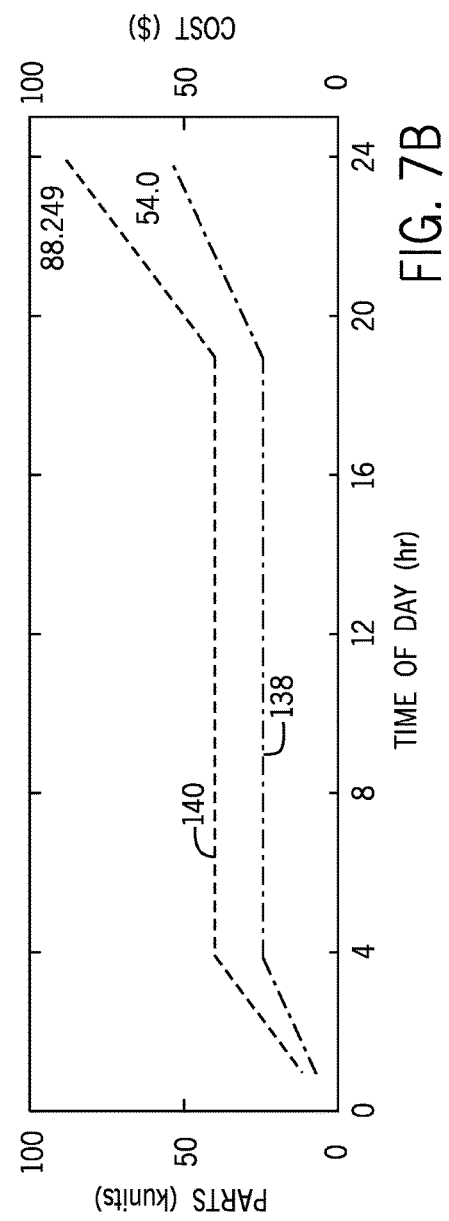
FIG. 7B is a graph depicting the number of parts produced in relation to the energy costs over the 24 hour period, in accordance with embodiments presented herein.

FIG. 7B is a graph 136 depicting the number of parts produced (represented by line 138) in relation to the energy cost (represented by line 140) over the 24 hour period, in accordance with embodiments presented herein. The parts are measured in thousands of units and the cost is measured in thousands of dollars. As depicted, the enhanced production rate schedule enables the industrial automation equipment 16 to produce 54,000 parts for approximately $88 over the 24 hour period, which may be less costly than using a fixed production rate (e.g., of 100 parts per minute).

Figure 8A:
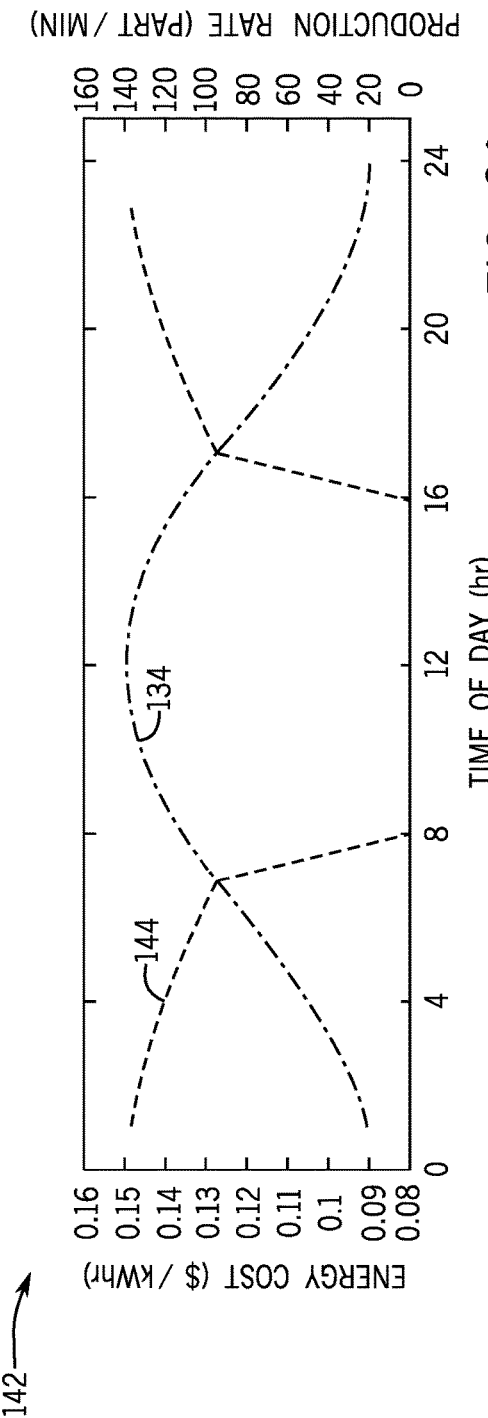
FIG. 8A is a graph depicting an enhanced production rate schedule to produce 108,000 parts in relation to the time-of-day energy costs over a 24 hour period, in accordance with embodiments presented herein.

FIG. 8A is a graph 142 depicting an enhanced production rate schedule (represented by line 144) to produce 108,000 parts in relation to the time-of-day energy costs (represented by line 134) over a 24 hour period, in accordance with embodiments presented herein. The time-of-day energy costs 134 are the same as shown in FIG. 7A. However, because the number of parts to be produced is twice as many (e.g., 108,000 parts) as desired in FIG. 7A (e.g., 54,000 parts), the enhanced production rate schedule 144 begins at 140 parts per minute at 0:00 and gradually decreases to 100 parts per minute around 7:00 when the cost is approximately 0.13 dollars per kilowatt-hour. Then, the enhanced production rate schedule 144 decreases to 0 parts per minute at 8:00 and begins to increase at 16:00 to 100 parts per minute around 17:00. The enhanced production rate schedule 144 continues to increase to 140 parts per minute by 24:00.

Figure 8B:
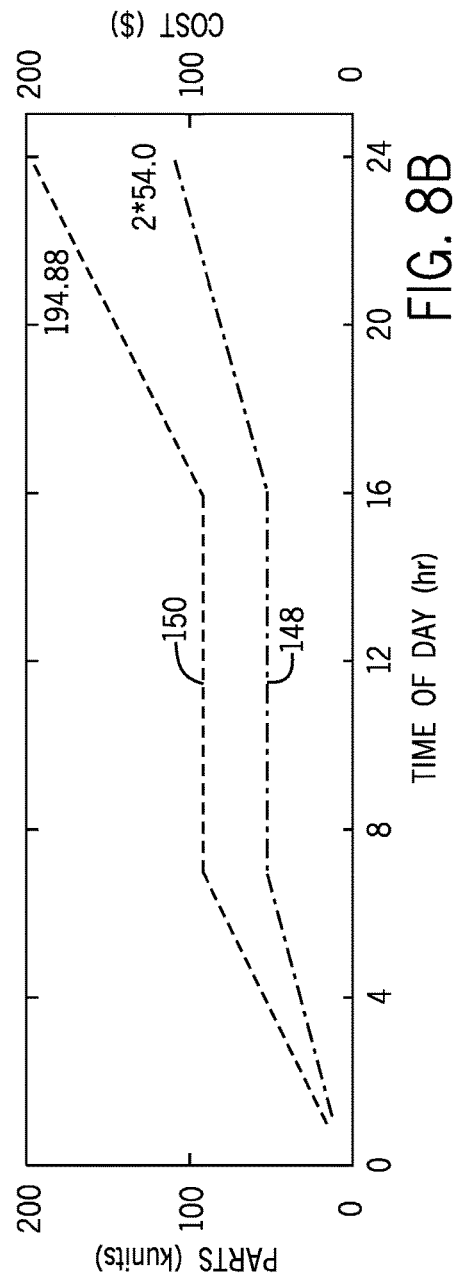
FIG. 8B is a graph depicting the number of parts produced in relation to the energy costs over the 24 hour period, in accordance with embodiments presented herein.

FIG. 8B is a graph 146 depicting the number of parts produced (represented by line 148) in relation to the energy costs (represented by line 150) over the 24 hour period, in accordance with embodiments presented herein. As depicted, the enhanced production rate schedule enables the industrial automation equipment 16 to produce 108,000 parts for approximately $194 over the 24 hour period, which may be less costly than using a fixed production rate.

Figure 9A:
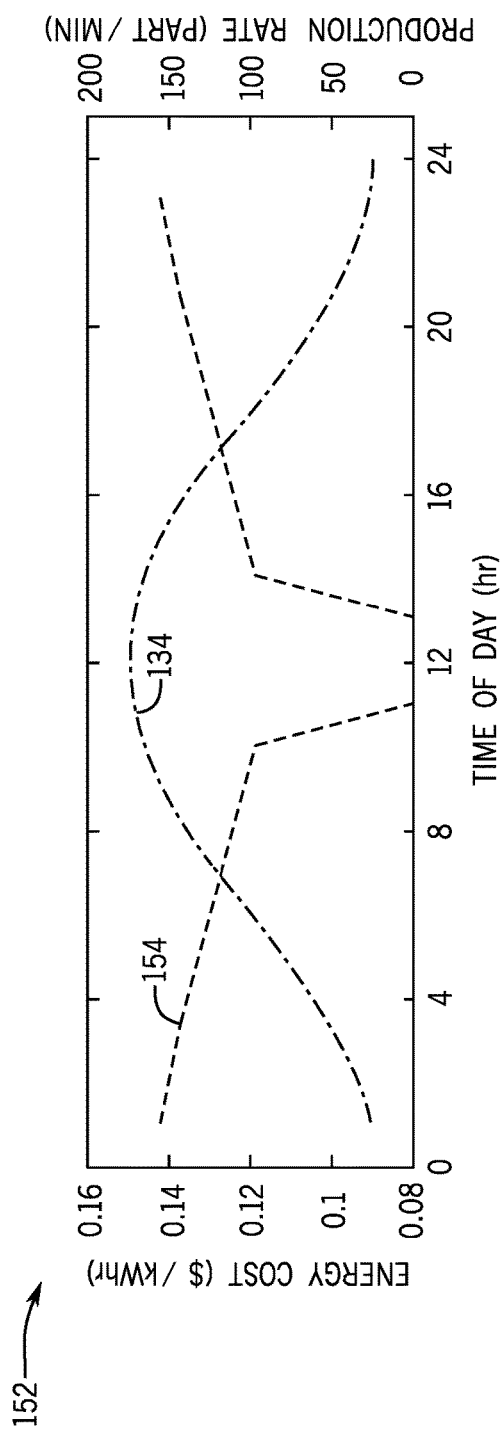
FIG. 9A is a graph depicting an enhanced production rate schedule to produce 162,000 parts in relation to the time-of-day energy costs over a 24 hour period, in accordance with embodiments presented herein.

FIG. 9A is a graph 152 depicting an enhanced production rate schedule (represented by line 154) to produce 162,000 parts in relation to the time-of-day energy costs (represented by line 132) over a 24 hour period, in accordance with embodiments presented herein. It should be noted that the time-of-day energy costs 134 are the same as shown in FIG. 7A. However, because the number of parts to be produced is three times as many (e.g., 162,000 parts) as desired in FIG. 7A (e.g., 54,000 parts), the enhanced production rate schedule 154 begins around 150 parts per minute at 0:00 and gradually decreases to 100 parts per minute around 10:00 when the cost is approximately 0.12 dollars per kilowatt-hour. Then, the enhanced production rate schedule 154 decreases to 0 parts per minute at 11:00 and begins to increase at 13:00 to 100 parts per minute around 14:00. The enhanced production rate schedule 144 continues to increase to around 150 parts per minute by 24:00.

Figure 9B:
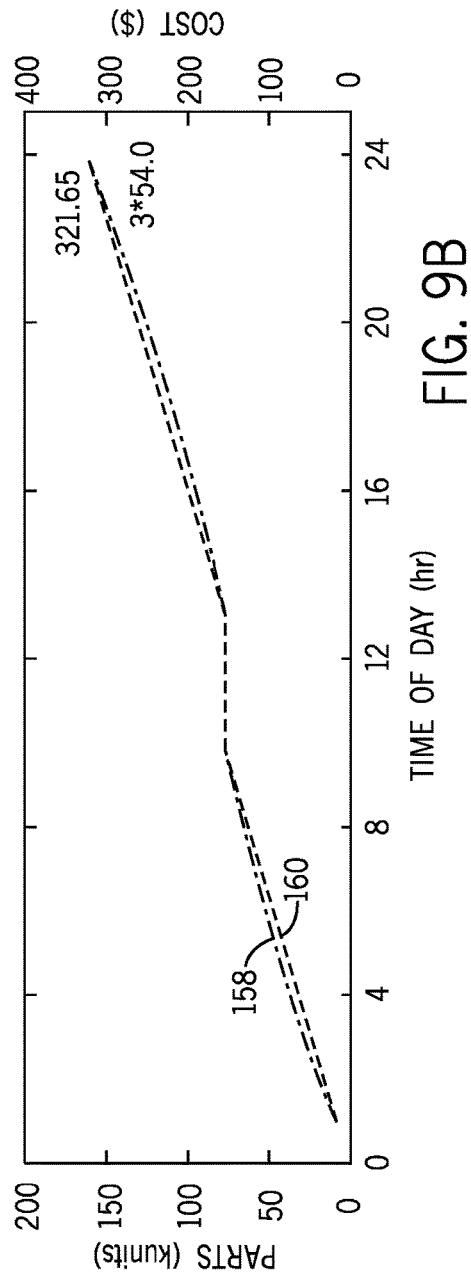
FIG. 9B is a graph depicting the number of parts produced in relation to the energy costs over the 24 hour period, in accordance with embodiments presented herein.

FIG. 9B is a graph 156 depicting the number of parts (represented by line 158) produced in relation to the energy costs (represented by line 160) over the 24 hour period, in accordance with embodiments presented herein. As depicted, the enhanced production rate schedule enables the industrial automation equipment 16 to produce 162,000 parts for approximately $321 over the 24 hour period, which may be less costly than using a fixed production rate.

FIG. 10A is a graph 162 depicting an enhanced production rate schedule (represented by line 164) to produce 54,000 parts in relation to the time-of-day energy costs (represented by line 166) over an 8 hour period, in accordance with embodiments presented herein. As discussed above, the enhanced production rate schedule 164 may be generated by the production rate planner 72 based on inputs, such as the learned energy consumption per part versus production rate curve, the time-of-day energy costs, tiered energy costs, and/or production objectives (e.g., 54,000 parts produced in 8 hours). The enhanced production rate schedule 164 includes the highest produced parts per minute (e.g., 150 parts per minute) when the energy cost is the lowest (e.g., approximately 0.09 dollars per kilowatt-hour) and the enhanced production rate schedule 164 includes the lowest produced parts per minute (e.g., 75 parts per minute) when the energy cost is the highest (e.g., 0.15 dollars per kilowatt-hour from 10:00 to 13:00).

FIG. 10B is a graph 168 depicting the number of parts produced (represented by line 170) in relation to the energy costs (represented by line 172) over the 8 hour period, in accordance with embodiments presented herein. As depicted, the enhanced production rate schedule enables the industrial automation equipment 16 to produce 54,000 parts for approximately $106 over the 8 hour period, which may be less costly than using a fixed production rate (e.g., 112.5 parts per minute).

Figure 11:
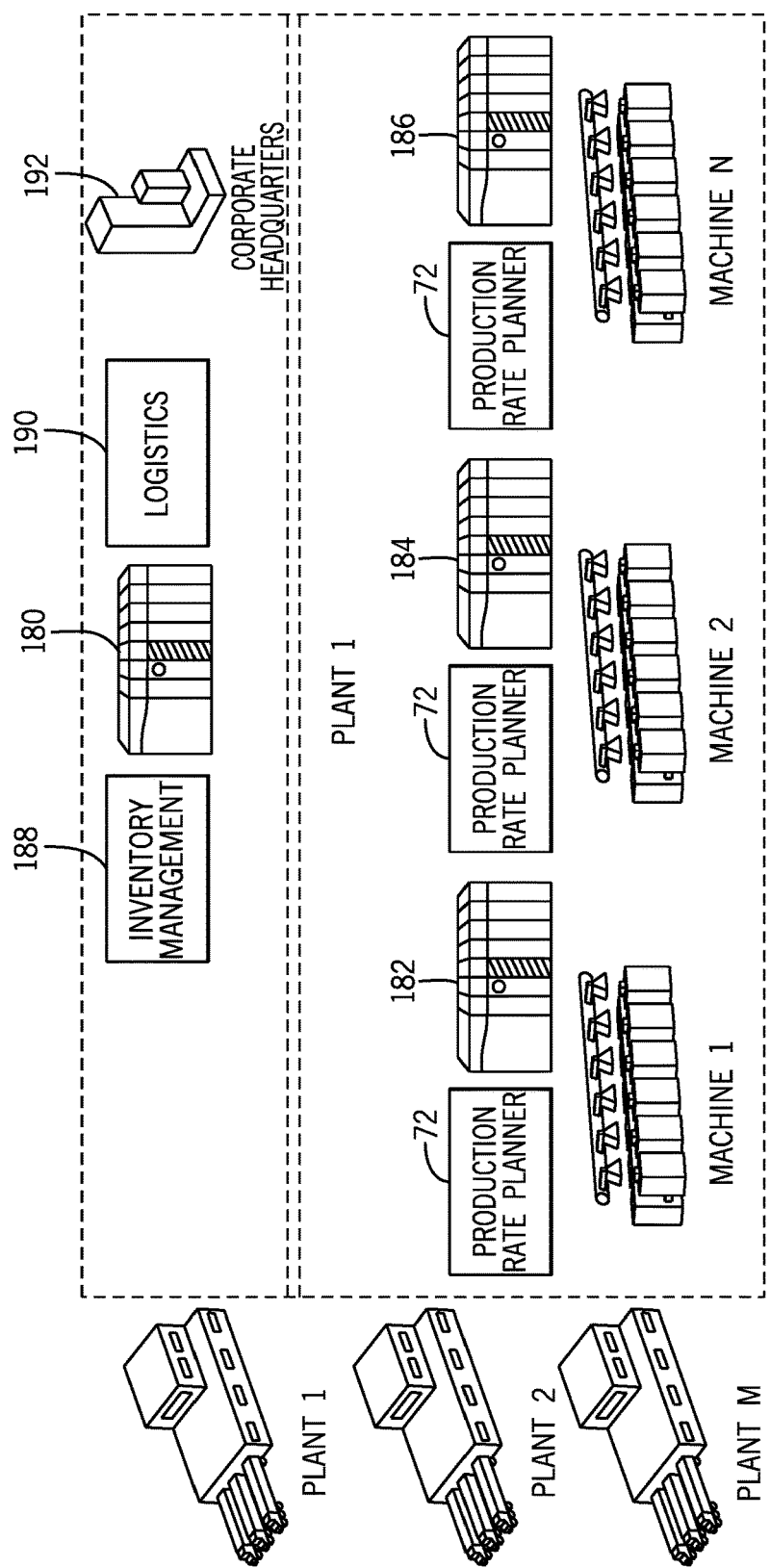
FIG. 11 is a schematic diagram of generating multiple enhanced production rate schedules to minimize energy costs for more than one machine, in accordance with embodiments presented herein.

FIG. 11 is a schematic diagram of generating multiple enhanced production rate schedules 82 to minimize energy costs for more than one piece of industrial automation equipment 16 (e.g., numerous machines), in accordance with embodiments presented herein. That is, the disclosed techniques may be used to perform production rate scheduling across multiple machines located in the same plant or in different plants. As depicted, a master control/monitoring device 180 may reside at the plant level (e.g., plant 1) that communicates with each machine control/monitoring device 182, 184, and 186 in the plant or at an industry level that communicates with each machine control/monitoring device in each of the plants (e.g., plant 1, plant 2, plant N). The master control/monitoring device 180 may receive production objectives (e.g., number of parts to produce and production time window) for each of the machines (e.g., machine 1, machine 2, machine N) in the plant (e.g., plant 1) or in the numerous plants (e.g., plant 1, plant 2, plant N) and energy costs associated with each machine location. Using the received information, the master control/monitoring device 180 may generate an enhanced production rate schedule 82 for each machine and send (e.g., transmit) the enhanced production rate schedules 82 to each respective production rate planner 72 of the machine control/monitoring device 182, 184, and 186 to be executed to result in a macro (e.g., global) level energy cost minimization. As may be appreciated, existing machines that are already built and in operation in different locations around the world may benefit from the disclosed techniques. For example, time-of-day energy costs and tiered energy costs may vary in different regions of the world. The master control/monitoring device 180 located at the plant level or the multiple plant level may account for the variations in the energy costs between different regions and generate enhanced production rate schedules 82 tailored for each particular region.

Additionally, the master control/monitoring device 180 may also consider inventory management 188 when determining the enhanced production rate schedules 82 for each machine in the enterprise. For example, the master control/monitoring device 180 may reduce the production rate for certain machines if the inventory for a certain part are at a sufficient level. The master control/monitoring device 180 may also account for logistics 190 when generating the enhanced production rate schedules 82 for each machine in a particular plant or plants in a certain region. For example, the master control/monitoring device 180 may determine the enhanced production rate schedules 82 for each machine in a plant based on the number of machines in the plant.

Further, in some embodiments, the master control/monitoring device 180 may generate visualizations of the enhanced production rate schedule 82 for the various machines included in the enterprise. Further, in some embodiments, the energy costs of operating each of the machines based on the applied enhanced production rate schedules 82 may be aggregated to obtain a macro level energy cost across all machines in an enterprise. In some embodiments, the master control/monitoring device 180 may reside at a corporate headquarters 192. However, it should be appreciated that the master control/monitoring device 180 may reside at any suitable location, such as at a plant.

Technical effects of the embodiments described herein include enabling visualization of the impact in energy consumption of various axis solutions (e.g., actuators, drives, and load transmission components) with and without different production rate schedules. Further effects include selecting and implementing the axis solution with the lowest energy consumption for the desired production rate range to build the industrial automation equipment 16. In addition, the production rate planner 72 may determine one or more enhanced production rate schedules 82 for one or more axis solutions that reduces the energy consumption for production objectives while accounting for utility energy cost (e.g., time-of-day energy costs, fixed energy cost, and/or tiered energy costs), number of parts, and operating time window. The enhanced production rate schedule 82 may be applied to the actuators, drives, and load transmission components solution to control the industrial automation equipment 16 accordingly. Also, the disclosed techniques enable visualizing and analyzing the year-over-year impact in energy consumption, among other things.

In the preceding specification, various embodiments have been described with reference to the accompanying drawings. It will, however, be evident that various modifications and changes may be made thereto, and additional embodiments may be implemented, without departing from the broader scope of the present disclosure as set forth in the claims that follow. The specification and drawings are accordingly to be regarded in an illustrative rather than restrictive sense.

The invention claimed is:

1. A tangible, non-transitory computer readable medium storing instructions that, when executed by a processor, are configured to cause the processor to:

receive a set of inputs comprising a motion profile of a machine, a mechanical design of the machine, or both;

generate a plurality of axis solutions for one or more actuators, drives, and load transmission components based on a model using the set of inputs;

generate a production rate versus amount of energy consumed per part curve for each of the plurality of axis solutions;

display the production rate versus amount of energy consumed per part curves for each of the plurality of axis solutions, wherein one of the production rate versus amount of energy consumed per part curves includes a point on the production rate versus amount of energy consumed per part curve indicative of a lowest amount of energy consumed for a desired production rate range;

select one axis solution of the plurality of axis solutions that is associated with the production rate versus amount of energy consumed per part curve including the point indicative of the lowest amount of energy consumed for the desired production rate range; and implement the selected axis solution to operate the machine at the production rate.

2. The computer readable medium of claim 1, wherein the instructions, when executed by the processor, are configured to cause the processor to generate a total cost of ownership versus time curve for each of the plurality of axis solutions, wherein the total cost of ownership is a summation of energy cost per time unit and bill of materials cost.

3. The computer readable medium of claim 2, wherein the instructions, when executed by the processor, are configured to cause the processor to select one axis solution of the plurality of axis solutions based at least on the production rate versus amount of energy consumed per part curves, the total cost of ownership versus time curves, or both.

4. The computer readable medium of claim 2, wherein the instructions, when executed by the processor, are configured to cause the processor to visually identify the point on the curve indicative of the lowest amount of energy consumed per part for the desired production rate range.

5. The computer readable medium of claim 1, wherein the instructions, when executed by the processor, are configured to cause the processor to implement the selected axis solution to build the machine.

6. The computer readable medium of claim 1, wherein the instructions, when executed by the processor, are configured to cause the processor to display the production rate versus amount of energy consumed per part curves in graphical format, tabular format, or both.

7. The computer readable medium of claim 1, wherein the instructions, when executed by the processor, are configured to cause the processor to generate the production rate versus amount of energy consumed per part curves by estimating an amount of energy consumed per part by each respective axis solution.

8. A method, comprising:

receiving, via a processor, one or more inputs comprising a motion profile of a machine in an industrial application, a mechanical design of the machine, time-of-day energy costs, tiered energy costs, a desired number of parts to be produced by the machine, a production time window, or some combination thereof;

generating, via the processor, a plurality of axis solutions for one or more actuators, drives, load transmission components, or some combination thereof, using a model of the machine based on at least a subset of the one or more inputs;

generating, via the processor, an enhanced production rate schedule that comprises a schedule of production rates that produce a lowest energy cost for the production time window while enabling the desired number of parts to be produced by the machine;

selecting, via the processor, an axis solution of the plurality of axis solutions using an objective function based at least on energy cost versus time, wherein the energy cost is estimated by simulating the machine running the enhanced production rate schedule, wherein the selected axis solution includes a point indicative of a lowest amount of energy consumed for a desired production rate range;

displaying, via the processor, an energy cost versus time curve associated with the enhanced production rate schedule employed by the selected axis solution; and applying, via the processor, the selected axis solution to control the machine according to the enhanced production rate schedule.

9. The method of claim 8, wherein the one of the plurality of axis solutions are selected based at least on total cost of ownership of the plurality of axis solutions versus time curves, wherein the total cost of ownership is a summation of energy cost per year and bill of materials cost, and the total cost of ownership is estimated by simulating the machine running the enhanced production rate schedule.

10. The method of claim 9, comprising displaying, via the processor, the total cost of ownership of the plurality of axis solutions versus time curves.

11. The method of claim 8, wherein the objective function comprises a nonlinear multivariable function comprising bounds for at least production rates and constraints for at least the time-of-day energy costs, the tiered energy costs, or both.

12. The method of claim 8, comprising:
determining, via the processor, energy cost for each of the plurality of axis solutions without the enhanced production rate schedule;
comparing energy cost versus time curves for each of the plurality of axis solutions employing the enhanced production rate schedule and not employing the enhanced production rate schedule; and
determining whether to employ the enhanced production rate schedule based on the comparison of the energy cost versus time curves.

13. The method of claim 8, wherein the time-of-day energy costs are based on a geographical location of the machine, and the tiered energy costs include one or more tiers comprising an allocation of energy for a specified energy cost based on a geographical location of the machine.

14. A system, comprising:
a machine in an industrial plant; and
a first control/monitoring device communicatively coupled to the machine and comprising a first processor, wherein the first processor is configured to:
receive one or more inputs comprising an energy consumption per part versus production rate curve, time-of-day energy costs, cumulative energy threshold costs, a desired number of parts to be produced by the machine, a production time window, or some combination thereof;
generate a plurality of axis solutions for the machine using a model of the machine based on at least a subset of the one or more inputs;
generate an enhanced production rate schedule for the machine using an objective function based at least on a subset of the one or more inputs, wherein the enhanced production rate schedule comprises a schedule of production rates that produce the lowest energy cost for the production time window while enabling the desired number of parts to be produced by the machine according to the objective function;
display an energy cost versus time curve for each of the plurality of axis solutions;
select an axis solution of the plurality of axis solutions that is associated with the enhanced production rate schedule, wherein the selected axis solution includes a point indicative of the lowest energy cost for a desired production rate range; and
apply the selected axis solution to control the machine according to the enhanced production rate schedule.

15. The system of claim 14, a second control/monitoring device communicatively coupled to the first control/monitoring device and other control/monitoring devices of other machines located in the industrial plant or other plants, wherein the second control/monitoring device comprises a second processor configured to:
generate an enhanced production rate schedule for each of the machines based on regional energy costs, production objectives, number of machines, or some combination thereof; and
send the enhanced production rate schedule to each respective control/monitoring device of the machines to be executed.

16. The system of claim 14, wherein the energy consumption per part versus production rate curve is learned by the first processor monitoring an amount of energy consumed per part by each production rate of the machine while the machine is operational.

17. The system of claim 16, wherein a design of the machine is not required by the first processor to measure the energy consumption per part versus production rate.

18. The system of claim 16, wherein the first processor is configured to learn the energy consumption per part versus production rate curve for any existing communicatively coupled machine.

* * * * *